US009508313B2

(12) United States Patent
Sato et al.

(10) Patent No.: US 9,508,313 B2
(45) Date of Patent: *Nov. 29, 2016

(54) DISPLAY DEVICE, PROGRAM INFORMATION DISPLAY METHOD IN DISPLAY DEVICE, RECEIVING DEVICE, AND SIGNAL TRANSMISSION METHOD IN RECEIVING DEVICE

(71) Applicants: Sony Espana S.A., Barcelona (ES); Sony Corporation, Tokyo (JP)

(72) Inventors: Ichiro Sato, Tokyo (JP); Yasuhisa Nakajima, Kanagawa (JP)

(73) Assignees: Sony Corporation (JP); Sony Europe Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,330

(22) Filed: Jan. 20, 2015

(65) Prior Publication Data

US 2015/0161965 A1 Jun. 11, 2015

Related U.S. Application Data

(63) Continuation of application No. 13/616,757, filed on Sep. 14, 2012, now Pat. No. 8,984,555, which is a continuation of application No. 12/291,592, filed on Nov. 12, 2008, now Pat. No. 8,289,449.

(30) Foreign Application Priority Data

Nov. 15, 2007 (JP) ................................ P2007-296323

(51) Int. Cl.
*G06F 3/00* (2006.01)
*G06F 13/00* (2006.01)
(Continued)

(52) U.S. Cl.
CPC .......... *G09G 5/006* (2013.01); *H04N 5/44543* (2013.01); *H04N 21/4122* (2013.01);
(Continued)

(58) Field of Classification Search
USPC .......................... 725/39, 105, 118, 120, 121
See application file for complete search history.

(56) References Cited

U.S. PATENT DOCUMENTS 7,373,650 B1 * 5/2008 Rodriguez ......... H04N 5/44591
348/565
2003/0056051 A1 * 3/2003 Burke .................. G06F 9/4411
710/302
(Continued)

FOREIGN PATENT DOCUMENTS

JP 2001008119 A 1/2001
JP WO 2007102413 A1 * 9/2007 ........... H04N 5/4401
(Continued)

OTHER PUBLICATIONS

HDMI Licensing, LLC, High-Definition Multimedia Interface, Specification Version 1.3a, Hitachi, Ltd. et al, Nov. 10, 2006.
(Continued)

*Primary Examiner* — Brian T Pendleton
*Assistant Examiner* — Alexander Gee
(74) *Attorney, Agent, or Firm* — Lerner, David, Littenberg, Krumholz & Mentlik, LLP

(57) ABSTRACT

There is provided a display device including a signal receiving unit for receiving a video signal from an external device via a transmission path through a plurality of channels using a differential signal, an information receiving unit for receiving program information from the external device using a bidirectional communication path including predetermined lines of the transmission path, an image display unit for displaying images on image display elements based on the video signal received by the signal receiving unit, and a program information display unit for displaying the program information on the image display elements based on the program information received by the information receiving unit.

1 Claim, 26 Drawing Sheets

(51) Int. Cl.
*H04N 5/445* (2011.01)
*H04N 7/173* (2011.01)
*G09G 5/00* (2006.01)
*H04N 21/41* (2011.01)
*H04N 21/436* (2011.01)
*H04N 21/44* (2011.01)
*H04N 21/442* (2011.01)
*H04N 21/482* (2011.01)
*G09G 5/12* (2006.01)

(52) U.S. Cl.
CPC ...... *H04N21/436* (2013.01); *H04N 21/44012* (2013.01); *H04N 21/44231* (2013.01); *H04N 21/482* (2013.01); *G09G 5/12* (2013.01); *G09G 2300/0426* (2013.01); *G09G 2320/0252* (2013.01); *G09G 2370/04* (2013.01); *G09G 2370/10* (2013.01); *G09G 2370/12* (2013.01)

(56) References Cited

U.S. PATENT DOCUMENTS

| | | |
|---|---|---|
| 2004/0095509 A1 | 5/2004 | Okamoto et al. |
| 2005/0034155 A1 | 2/2005 | Gordon et al. |
| 2006/0209892 A1* | 9/2006 | MacMullan ........... H04N 5/775 370/468 |
| 2007/0019926 A1 | 1/2007 | Lee |
| 2008/0104660 A1 | 5/2008 | Oh |
| 2008/0187028 A1* | 8/2008 | Lida ........................ H04L 5/143 375/140 |
| 2008/0271074 A1 | 10/2008 | Bae et al. |
| 2009/0046993 A1* | 2/2009 | Nishio ............. H04N 21/43622 386/235 |

FOREIGN PATENT DOCUMENTS

| | | |
|---|---|---|
| WO | 02/078336 A1 | 10/2002 |
| WO | 2007072791 A1 | 6/2007 |
| WO | 2007102413 A1 | 9/2007 |

OTHER PUBLICATIONS

Office Action from Japanese Application No. 2007-296323, dated Oct. 23, 2012.

* cited by examiner

FIG.7

HDMI PIN ASSIGNMENT (FOR TYPE-A)

| PIN | Signal Assignment | PIN | Signal Assignment |
|---|---|---|---|
| 1 | TMDS Data2+ | 2 | TMDS Data2 Shield |
| 3 | TMDS Data2- | 4 | TMDS Data1+ |
| 5 | TMDS Data1 Shield | 6 | TMDS Data1- |
| 7 | TMDS Data0+ | 8 | TMDS Data0 Shield |
| 9 | TMDS Data0- | 10 | TMDS Clock+ |
| 11 | TMDS Clock Shield | 12 | TMDS Clock- |
| 13 | CEC | 14 | Reserved (N.C.on device) |
| 15 | SCL | 16 | SDA |
| 17 | DDC/CEC Ground | 18 | +5V Power |
| 19 | Hot Plug Detect | | |

FIG. 18

E-EDID VENDOR SPECIFIC DATA BLOCK STRUCTURE

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Support-AI | DC_48bit | DC_36bit | DC_36bit | DC_Y444 | Reserved (0) | Reserved (0) | DVI-Dual |
| 7 | Max_TMDS_Clock | | | | | | | |
| 8 | Latency | Full Duplex | Half Duplex | | Reserved (0) | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

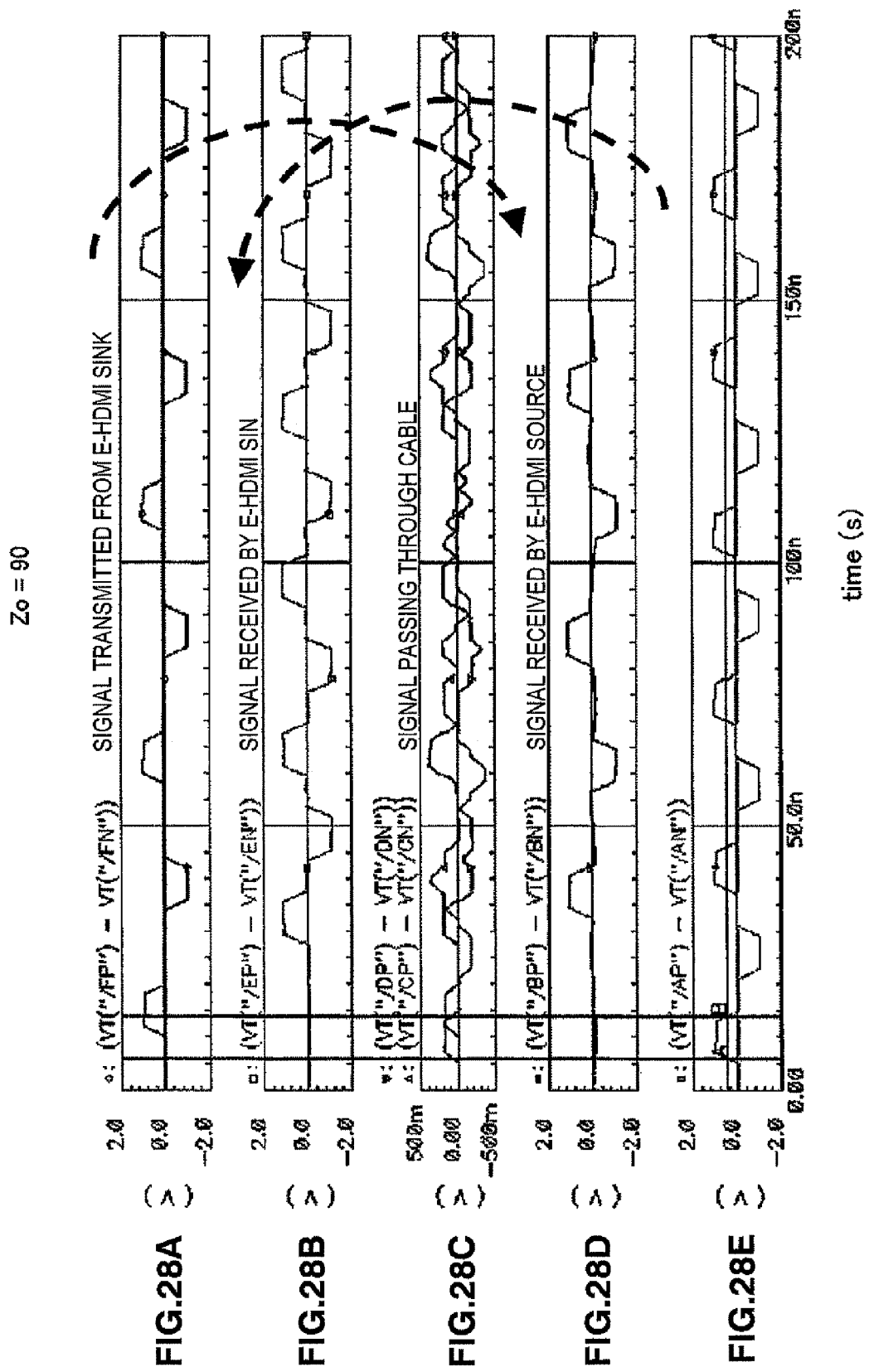

DISPLAY DEVICE, PROGRAM INFORMATION DISPLAY METHOD IN DISPLAY DEVICE, RECEIVING DEVICE, AND SIGNAL TRANSMISSION METHOD IN RECEIVING DEVICE

CROSS REFERENCES TO RELATED APPLICATIONS

The present application is a continuation of U.S. application Ser. No. 13/616,757, filed on Sep. 14, 2012, which is a continuation of U.S. application Ser. No. 12/291,592, (now U.S. Pat. No. 8,289,449) filed on Nov. 12, 2008, which claims priority from Japanese Patent Application No. JP 2007-296323, filed in the Japanese Patent Office on Nov. 15, 2007, the disclosures of which are incorporated herein by reference.

BACKGROUND OF THE INVENTION

Field of the Invention

The present invention relates to a program information display method in a display device, a receiving device, and a signal transmission method in the receiving device.

More particularly, the present invention relates to a display device enabled to control an external device using program information by receiving and displaying the program information from the external device using a bidirectional communication path including predetermined lines of a transmission path, in addition to receiving a video signal of a predetermined program from the external device via the transmission path.

Also, the present invention relates to a receiving device enabled to control the receiving device itself using program information from an external device by transmitting the program information to the external device using a bidirectional communication path including predetermined lines of a transmission path, in addition to transmitting a video signal to the external device via the transmission path.

Description of the Related Art

In recent years, an HDMI (High Definition Multimedia Interface) has been increasingly used as a communication interface to transmit a digital video signal, that is, an uncompressed (baseband) video signal (hereinafter, referred to as "image data") and a digital sound signal (hereinafter, referred to as "sound data") accompanying the video signal at high speed, for example, from a DVD (Digital Versatile Disc) recorder, set top box, or other AV (Audio Visual) sources to a TV set, projector, or other displays. For example, WO2002/078336 provides a detailed description of the HDMI standard.

SUMMARY OF THE INVENTION

An AV system in which a set top box (STB) capable of receiving a broadcasting signal of a cable TV, satellite broadcasting, IP broadcasting and the like is connected to a TV set capable of receiving a broadcasting signal of terrestrial analog broadcasting, terrestrial digital broadcasting, digital cable broadcasting and the like via an HDMI cable can be considered.

In a TV set and set top box in related art, EPG (Electronic Program Guide) information is independently received by the TV set and set top box to perform processing. Thus, it is necessary for the AV system to display a program guide (program information) or realize an application using the program guide by individual devices and it has been difficult, for example, to display both program guides by the TV set or to control both devices in a unified manner by the TV set.

Thus, it is desirable to enable control of a receiving device based on program information from a display device connected to the receiving device.

An idea of the present invention is
a display device including:
a signal receiving unit for receiving a video signal from an external device via a transmission path through a plurality of channels using a differential signal;
an information receiving unit for receiving program information from the external device using a bidirectional communication path including predetermined lines of the transmission path;
an image display unit for displaying images on image display elements based on the video signal received by the signal receiving unit; and
a program information display unit for displaying the program information on the image display elements based on the program information received by the information receiving unit.

Another idea of the present invention is
a receiving device including:
a broadcast receiving unit for obtaining a video signal of a predetermined program and program information by receiving a broadcasting signal;
a signal transmitting unit for transmitting the video signal obtained by the broadcast receiving unit to an external device via a transmission path through a plurality of channels using a differential signal; and
an information transmitting unit for transmitting the program information obtained by the broadcast receiving unit to the external device using a using a bidirectional communication path including predetermined lines of the transmission path.

In the receiving device, a video signal of a predetermined program and program information are obtained by receiving a broadcasting signal. The video signal of the predetermined program is transmitted to the external device (display device) such as a TV set via the transmission path. The program information is transmitted to the external device (display device) using the bidirectional communication path including predetermined lines of the transmission path. For example, the receiving device is connected to the external device (display device) by an HDMI cable and the predetermined lines are a reserved line and HPD line constituting the HDMI cable.

Program information is transmitted from the receiving device to the external device (display device) when, for example, a transmission request is received from the external device via a control data line constituting the transmission path or the bidirectional communication path. A transmission request is transmitted from the external device (display device) to the receiving device when, for example, a user provides instructions to display a program guide.

In the display device, a video signal is received from the external device (receiving device) such as a set top box via the transmission path. Program information is received from the external device (receiving device) using the bidirectional communication path. Moreover, for example, in the display device, a broadcasting signal is further received to obtain the video signal of a predetermined program and the program information. Then, images are displayed on the image display elements based on the video signal received from the external device and that obtained after the broadcasting signal being received. In this case, images from both video signals are displayed simultaneously or individually.

Also, program information is displayed on the image display elements based on program information received from the external device and that obtained after a broadcasting signal being received. For example, program information received from the external device and that obtained after a broadcasting signal being received are displayed simultaneously on the image display elements. With program information on both sides being displayed simultaneously in this manner, control based on program information, for example, control of program selection and setting for program recording in the display device and external device (receiving device) becomes possible from the same screen.

Control information of the external device (receiving device) generated by the display device is transmitted to the external device (receiving device) using the control data line constituting the transmission path or the bidirectional communication path. The control information transmitted from the display device in this manner is received by the external device (receiving device) to effect control based on the program information, for example, control of program selection and setting for program recording.

Thus, in the display device, in addition to receiving a video signal from the receiving device via the transmission path, program information is received from the receiving device using the control data line constituting the transmission path or the bidirectional communication path. Thus, it becomes possible for the display device to effect control of the external device (receiving device), for example, control of program selection and setting for program recording using the program information.

According to a display device of the present invention described above, in addition to receiving a video signal of a predetermined program from an external device via a transmission path, program information is received from the external device using a bidirectional communication path including predetermined lines of the transmission path and displayed so that control of the external device using the program information becomes possible.

Also, according to a receiving device of the present invention described above, in addition to transmitting a video signal to an external device via a transmission path, program information is transmitted to the external device using a bidirectional communication path including predetermined lines of the transmission path so that control of the receiving device using the program information from the external device becomes possible.

BRIEF DESCRIPTION OF THE DRAWINGS

FIG. 7 is a diagram showing pin arrangement (type A) of an HDMI terminal;

FIG. 18 is a diagram showing an E-EDID vendor specific data block structure;

FIG. 28A is a diagram showing bidirectional communication waveforms;

FIG. 28B is a diagram showing bidirectional communication waveforms;

FIG. 28C is a diagram showing bidirectional communication waveforms;

FIG. 28D is a diagram showing bidirectional communication waveforms; and

FIG. 28E is a diagram showing bidirectional communication waveforms.

DETAILED DESCRIPTION OF THE PREFERRED EMBODIMENTS

Figure 1:
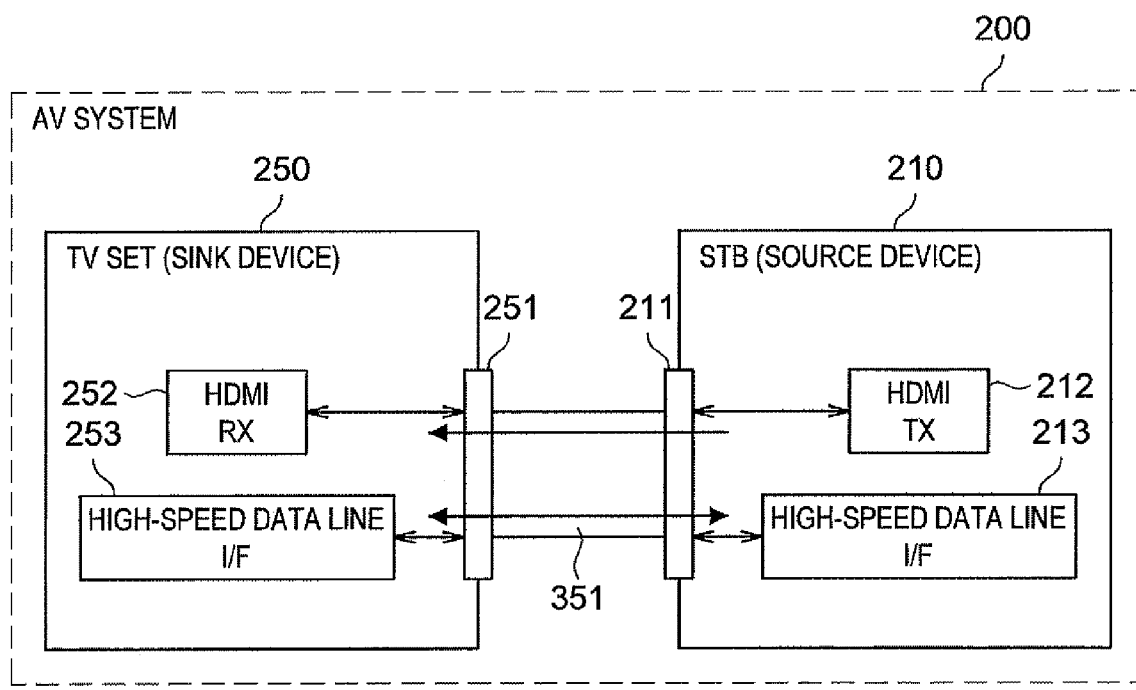
FIG. 1 is a block diagram showing a configuration example of an AV system as an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 shows a configuration example of an AV (Audio Visual) system 200 as an embodiment.

The AV system 200 has a set top box (STB) 210 as a source device and a TV set 250 as a sink device. The set top box 210 and the TV set 250 are connected via an HDMI cable 351.

The set top box 210 is provided with an HDMI terminal 211 connected to an HDMI transmitting unit (HDMI TX) 212 and a high-speed data line interface (I/F) 213. The TV set 250 is provided with an HDMI terminal 251 connected to an HDMI receiving unit (HDMI RX) 252 and a high-speed data line interface (I/F) 253. One end of the HDMI cable 351 is connected to the HDMI terminal 211 of the set top box 210 and the other end of the HDMI cable 351 is connected to the HDMI terminal 251 of the TV set 250.

Figure 2:
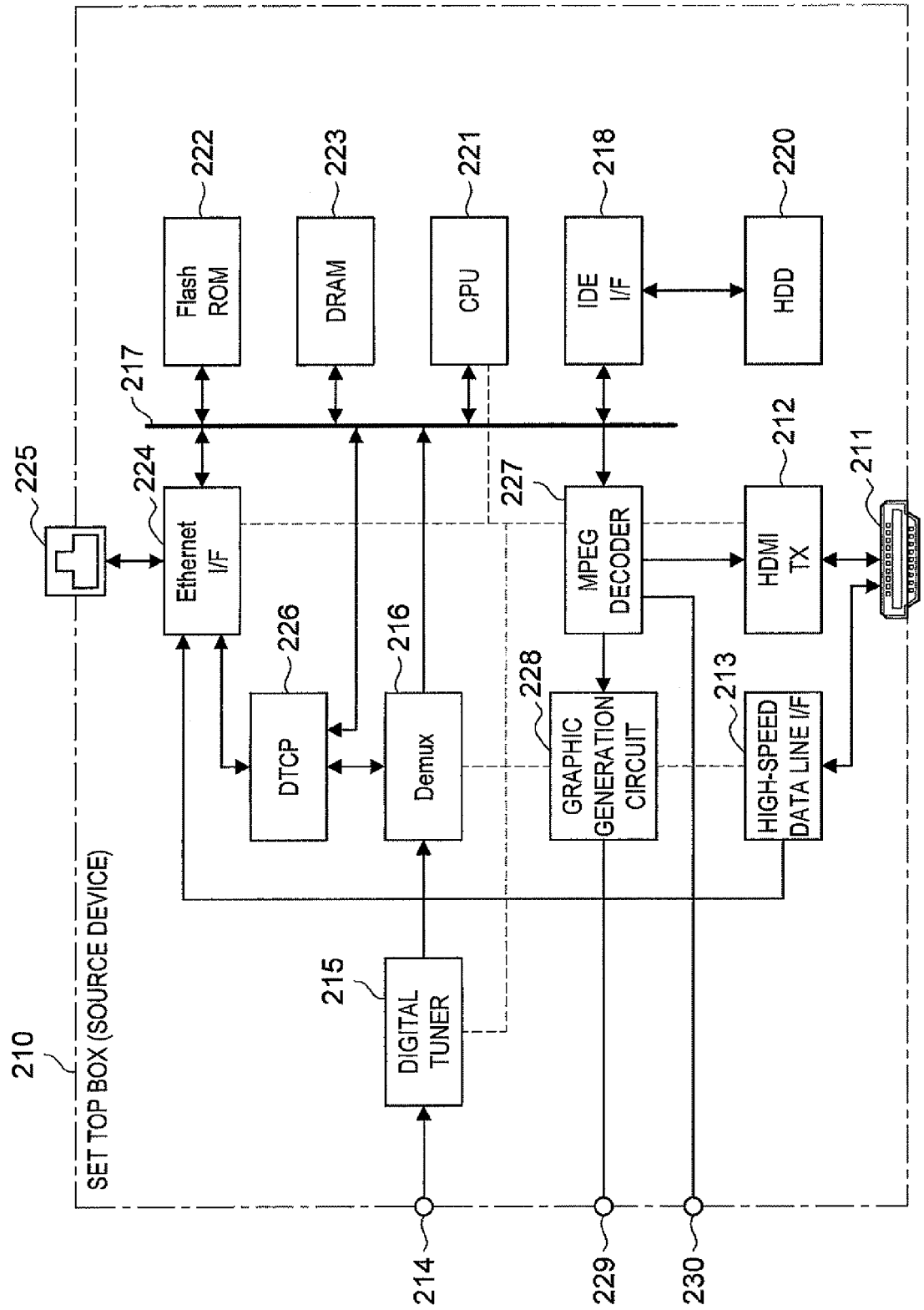
FIG. 2 is a block diagram showing a configuration example of a set top box (source device) constituting the AV system.

FIG. 2 is a configuration example of the set top box 210. The set top box 210 has the HDMI terminal 211, the HDMI transmitting unit 212, the high-speed data line interface 213, an antenna terminal 214, a digital tuner 215, a demultiplexer 216, an internal bus 217, an IDE interface 218, a HDD (Hard Disk Drive) 220, a CPU (Central Processing Unit) 221, a flash ROM (Read Only Memory) 222, a DRAM 223, an Ethernet interface 224, a network terminal 225, a DTCP circuit 226, an MPEG decoder 227, a graphic generation circuit 228, a video output terminal 229, and a sound output terminal 230. "Ethernet" is a registered trademark.

The HDMI transmitting unit (HDMI source) 212 sends out data of baseband video (images) and sound by communication conforming to HDMI from the HDMI terminal 211. Details of the HDMI transmitting unit 212 will be described later. The high-speed data line interface 213 is a bidirectional communication interface including a predetermined line (in the present embodiment, a reserved line or HPD line) of HDMI cable. Details of the high-speed data line interface 213 will be described later.

The antenna terminal 214 is a terminal into which a broadcasting signal received by a receiving antenna (not shown) is input. The broadcasting signal is, for example, a broadcasting signal by a satellite digital method. The digital tuner 215 outputs a predetermined transport stream by processing the broadcasting signal input into the antenna terminal 214. The demultiplexer 216 extracts a partial TS (TS packets of video data and those of sound data) corresponding to a predetermined selected channel from the transport stream obtained by the digital tuner 215.

The demultiplexer 216 also extracts electronic program information (EPG information) from the transport stream obtained by the digital tuner 215. The electronic program information is stored in the flash ROM 222 via the CPU 221.

The CPU 221, the flash ROM 222, the DRAM 223, the demultiplexer 216, the Ethernet interface 224, and the IDE interface 218 are connected to the internal bus 217. The HDD 220 is connected to the internal bus 217 via the IDE interface 218. The HDD 220 records a partial TS extracted by the demultiplexer 216. The HDD 220 also reproduces a partial TS recorded in a recording medium.

The MPEG decoder 227 obtains video data by performing decode processing on a partial TS extracted by the demultiplexer 216 or video PES packets constituting a partial TS reproduced by the HDD 220. The MPEG decoder 227 also obtains sound data by performing decode processing on sound PES packets constituting the partial TS.

The graphic generation circuit 228 performs superimposition processing of graphic data when necessary on video data obtained by the MPEG decoder 227. The video output terminal 229 outputs video data output from the graphic generation circuit 228. The sound output terminal 230 outputs sound data obtained by the MPEG decoder 227.

The DTCP circuit 226 encodes a partial TS extracted by the demultiplexer 216 or that reproduced by the HDD 220 if necessary. The DTCP circuit 226 also decodes encoded data supplied from the network terminal 225 or the high-speed data line interface 213 to the Ethernet interface 224.

The CPU 221 controls operations of each unit of the set top box 210. The flash ROM 222 stores control software and maintains data. The DRAM 223 constitutes a work area of the CPU 221. The CPU 221 controls each unit of the set top box 210 by expanding software and data read from the flash ROM 222 on the DRAM 223 to activate the software.

An operation of the set top box 210 shown in FIG. 2 will be described briefly.

A TV broadcasting signal input into the antenna terminal 214 is supplied to the digital tuner 215. The digital tuner 215 processes the TV broadcasting signal to extract a predetermined transport stream and the predetermined transport stream is supplied to the demultiplexer 216. The demultiplexer 216 extracts a partial TS (TS packets of video data and those of sound data) corresponding to a predetermined channel from the transport stream. The partial TS is supplied to the HDD 220 via the IDE interface 218 before being recorded based on recording instructions from the CPU 221.

The demultiplexer 216 also extracts electronic program information from the predetermined transport stream extracted by the digital tuner 215. The electronic program information is supplied to the flash ROM 222 via the CPU 221 to be stored in the flash ROM 222. The electronic program information is program information related to a broadcasting signal input into the antenna terminal 214, that is, information about programs receivable by the set top box 210.

As described above, a partial TS extracted by the demultiplexer 216 or that reproduced by the HDD 220 is supplied to the MPEG decoder 227. In the MPEG decoder 227, decode processing is performed on video PES packets including TS packets of video data to obtain video data. After superimposition processing is performed on graphic data by the graphic generation circuit 228, the video data is output to the video output terminal 229. Also in the MPEG decoder 227, decode processing is performed on sound PES packets including TS packets of sound data to obtain sound data. The sound data is output to the sound output terminal 230.

Corresponding to a partial TS extracted by the demultiplexer 216 or that reproduced by the HDD 220, video (image) data and sound data obtained by the MPEG decoder 227 are supplied to the HDMI transmitting unit 212 before being sent out to the HDMI cable connected to the HDMI terminal 211 if necessary.

In addition, a partial TS extracted by the demultiplexer 216 or that reproduced by the HDD 220 is encoded by the DTCP circuit 226 before being supplied to the high-speed data line interface 213 via the Ethernet interface 224 as transmission data if necessary. Thus, the partial TS is transmitted to a device at the other end via the predetermined line of the HDMI cable connected to the HDMI terminal 211.

Electronic program information stored in the flash ROM 222 is supplied to the high-speed data line interface 213 via the Ethernet interface 224 as transmission data if necessary. Thus, the electronic program information is transmitted to a device at the other end via the predetermined line of the HDMI cable connected to the HDMI terminal 211.

When a partial TS extracted by the demultiplexer 216 or that reproduced by the HDD 220 is sent out to a network, the partial TS is encoded by the DTCP circuit 226 before being output to the network terminal 225 via the Ethernet interface 224.

An encoded partial TS input into the network terminal 225 or received by the high-speed data line interface 213 from the HDMI terminal 211 is decoded after being supplied to the DTCP circuit 226 via the Ethernet interface 224 if necessary. A partial TS decoded by the DTCP circuit 226 in this manner is supplied to the HDD 220 via the IDE interface 218 before being recorded based on recording instructions from the CPU 221.

Also, IP packets containing remote control code transmitted through the predetermined line of the HDMI cable connected to the HDMI terminal 211 are received by the high-speed data line interface 213. The IP packets are supplied to the CPU 221 via the Ethernet interface 224. If remote control code contained in the IP packets is related to control of the set top box 210, the CPU 221 control each unit of the set top box 210 based on the remote control code.

Figure 3:
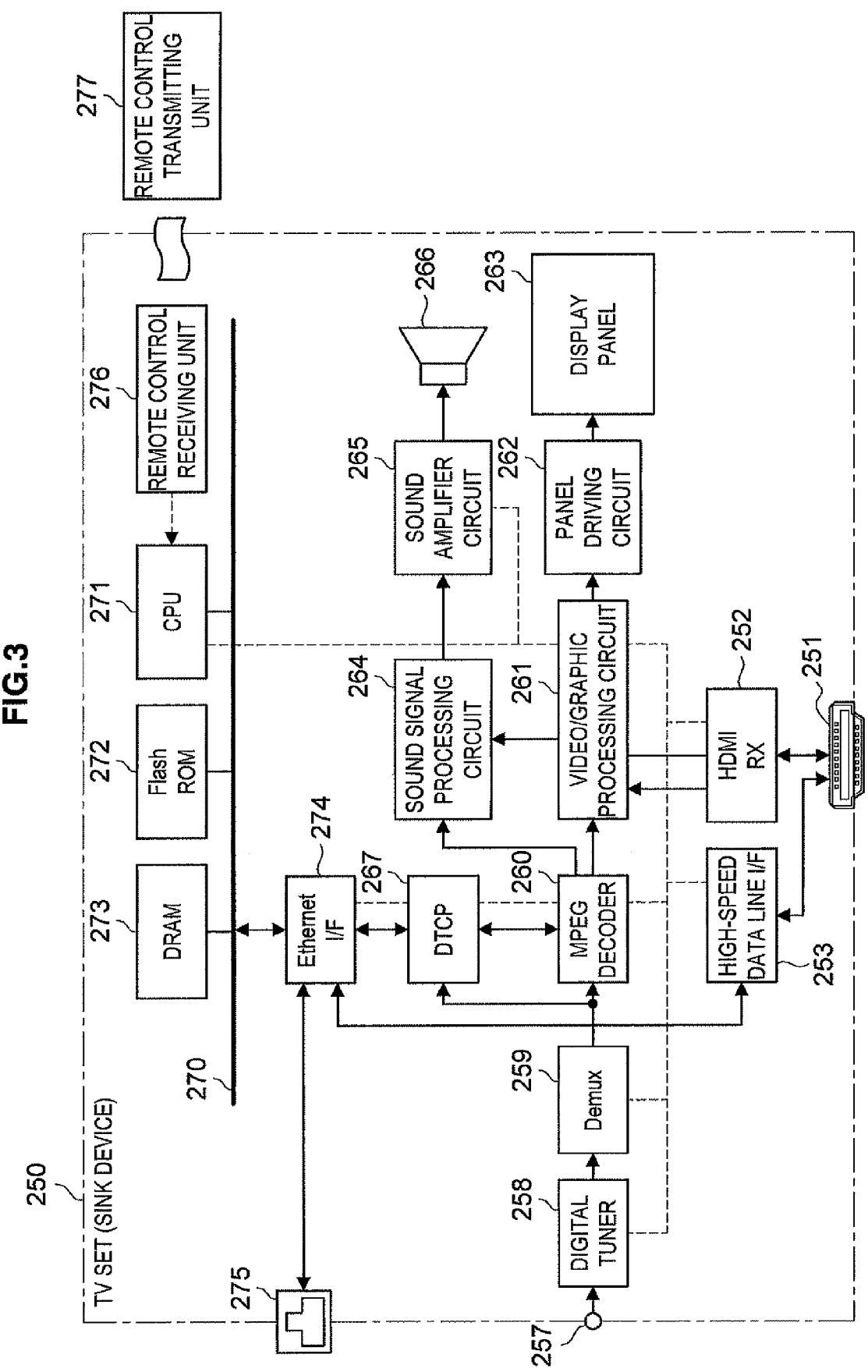
FIG. 3 is a block diagram showing a configuration example of a TV set (sink device) constituting the AV system.

FIG. 3 shows a configuration example of the TV set 250. The TV set 250 has the HDMI terminal 251, the HDMI receiving unit 252, the high-speed data line interface 253, an antenna terminal 257, a digital tuner 258, a demultiplexer 259, an MPEG decoder 260, a video/graphic processing circuit 261, a panel driving circuit 262, a display panel 263, a sound signal processing circuit 264, a sound amplifier circuit 265, a speaker 266, a DTCP circuit 267, an internal bus 270, a CPU 271, a flash ROM 272, a DRAM 273, an Ethernet interface 274, a network terminal 275, a remote control receiving unit 276, and a remote control transmitter 277.

The HDMI receiving unit (HDMI sink) 252 receives data (non-compressed video, sound signal) of baseband video (images) and sound supplied to the HDMI terminal 251 by communication conforming to HDMI. Details of the HDMI receiving unit 252 will be described later. The high-speed data line interface 253 is a bidirectional communication interface including a predetermined line (in the present embodiment, a reserved line or HPD line) of HDMI cable. Details of the high-speed data line interface 253 will be described later.

The antenna terminal 257 is a terminal into which a TV broadcasting signal received by a receiving antenna (not shown) is input. The broadcasting signal is, for example, a broadcasting signal by a terrestrial digital method. The digital tuner 258 outputs a predetermined transport stream corresponding to a user-selected channel by processing the broadcasting signal input into the antenna terminal 257. The demultiplexer 259 extracts a partial TS (transport stream) (TS packets of video data and those of sound data) corresponding to the user-selected channel from the transport stream obtained by the digital tuner 258.

The demultiplexer 259 also extracts electronic program information (EPG information) from the transport stream obtained by the digital tuner 258. The electronic program information is stored in the flash ROM 272 via the CPU 271.

The MPEG decoder 260 obtains video data by performing decode processing on video PES (packetized elementary stream) packets including TS packets of the video data obtained by the demultiplexer 259. The MPEG decoder 260 also obtains sound data by performing decode processing on sound PES packets including TS packets of the sound data obtained by the demultiplexer 259. If necessary, the MPEG decoder 260 performs decode processing on video PES packets and sound PES packets obtained by the DTCP circuit 267 through decoding to obtain video data and sound data respectively.

The video/graphic processing circuit 261 performs multi-screen processing and superimposition processing of graphic data on video data obtained by the MPEG decoder 260 if necessary. The panel driving circuit 262 drives the display panel 263 based on video data output from the video/graphic processing circuit 261. The display panel 263 is constructed, for example, from an LCD (liquid crystal display), PDP (plasma display panel), or OLED (organic light-emitting diode) display.

The sound signal processing circuit 264 performs necessary processing such as D/A conversion on sound data obtained by the MPEG decoder 260. The sound amplifier circuit 265 amplifies a sound signal output from the sound signal processing circuit 264 and supplies the amplified sound signal to the speaker 266.

The DTCP circuit 267 encodes a partial TS extracted by the demultiplexer 259 if necessary. The DTCP circuit 267 also decodes encoded data supplied to the Ethernet interface 274 from the network terminal 275 or the high-speed data line interface 253 if necessary.

The CPU 271 controls operations of each unit of the TV set 250. The flash ROM 272 stores control software and maintains data. The DRAM 273 constitutes a work area of the CPU 271. The CPU 271 controls each unit of the TV set 250 by expanding software and data read from the flash ROM 272 on the DRAM 273 to activate the software.

The remote control receiving unit 276 receives a remote control signal (remote control code) transmitted from the remote control transmitter 277 and supplies the remote control signal to the CPU 271. The CPU 271, the flash ROM 272, the DRAM 273, and the Ethernet interface 274 are connected to the internal bus 270. If remote control code is related to control of the TV set 250, the CPU 271 control each unit of the TV set 250 based on the remote control code.

The CPU 271 also generates an IP packet containing remote control code supplied from the remote control receiving unit 276 and outputs the IP packet to the HDMI terminal 251 via the Ethernet interface 274 and the high-speed data line interface 253. Accordingly, the remote control code transmitted from the remote control transmitter 277 is transmitted to an external device connected to the TV set 250 through the bidirectional communication interface including the predetermined line of the HDMI cable. Thus, the external device also becomes controllable by operating the remote control transmitter 277.

An operation of the TV set 250 shown in FIG. 3 will be described briefly.

A TV broadcasting signal input into the antenna terminal 257 is supplied to the digital tuner 258. The digital tuner 258 processes the TV broadcasting signal to output a predetermined transport stream corresponding to the user-selected channel and the predetermined transport stream is supplied to the demultiplexer 259. In the demultiplexer 259, a partial TS (TS packets of video data and those of sound data)

corresponding to the user-selected channel is extracted from the transport stream and the partial TS is supplied to the MPEG decoder 260.

The demultiplexer 259 also extracts electronic program information from the predetermined transport stream extracted by the digital tuner 258. The electronic program information is supplied to the flash ROM 272 via the CPU 271 to be stored in the flash ROM 272. The electronic program information is program information related to a broadcasting signal input into the antenna terminal 257, that is, information about programs receivable by the TV set 250. The electronic program information stored in the flash ROM 272 as described above is used when a program guide (program information) is displayed on the display panel 263. In the TV set 250, programs can be selected and set for recording for the TV set 250 based on the program guide.

In the MPEG decoder 260, decode processing is performed on video PES packets including TS packets of video data to obtain video data. Multi-screen processing and superimposition processing of graphic data are performed on the video data by the video/graphic processing circuit 261 if necessary before the video data is supplied to the panel driving circuit 262. Thus, images corresponding to the user-selected channel are displayed on the display panel 263.

Also in the MPEG decoder 260, decode processing is performed on sound PES packets including TS packets of sound data to obtain sound data. Necessary processing such as D/A conversion is performed on the sound data by the sound signal processing circuit 264 and the sound data is amplified by the sound amplifier circuit 265 before being supplied to the speaker 266. Thus, a sound corresponding to the user-selected channel is output from the speaker 266.

When a partial TS extracted by the demultiplexer 259 is supplied to a device at the other end connected by an HDMI cable while the TV broadcasting signal is received, the partial TS is encoded by the DTCP circuit 267 before being supplied to the high-speed data line interface 253 via the Ethernet interface 274 as transmission data. Thus, the partial TS is transmitted to the device at the other end via a bidirectional communication path including a predetermined line of the HDMI cable connected to the HDMI terminal 251 as Ethernet IP packets.

When a partial TS extracted by the demultiplexer 259 is sent out to a network while the TV broadcasting signal is received, the partial TS is encoded by the DTCP circuit 267 before being output to the network terminal 275 via the Ethernet interface 274.

An encoded partial TS supplied to the network terminal 275 or received by the high-speed data line interface 253 from the HDMI terminal 251 is decoded after being supplied to the DTCP circuit 267 via the Ethernet interface 274 if necessary. Then, the partial TS is decoded after being supplied to the MPEG decoder 260 to obtain video (image) data and sound data. Hereafter, the operation is similar to that when a TV broadcasting signal is received as described above and images are displayed on the display panel 263 and a sound is output from the speaker 266.

Electronic program information of a device at the other end received by the high-speed data line interface 253 from the HDMI terminal 251 is supplied to the flash ROM 272 from the Ethernet interface 274 via the CPU 271 to be stored in the flash ROM 272. The electronic program information stored in the flash ROM 272 as described above is used when a program guide is displayed on the display panel 263. In the TV set 250, programs can be selected and set for recording for the device at the other end based on the program guide.

The HDMI receiving unit 252 acquires data of baseband video (images) and sound input into the HDMI terminal 251 through the HDMI cable. The data of video and that of sound are supplied to the video/graphic processing circuit 261 and the sound signal processing circuit 264 respectively. Hereafter, the operation is similar to that when a TV broadcasting signal is received as described above and images are displayed on the display panel 263 and a sound is output from the speaker 266.

The remote control receiving unit 276 receives remote control code (remote control signal) transmitted from the remote control transmitter 277 and the remote control code is supplied to the CPU 271. If the remote control code is related to control of the TV set 250, the CPU 271 control each unit of the TV set 250 based on the remote control code.

The CPU 271 also generates an IP packet containing remote control code supplied from the remote control receiving unit 276. The IP packet is output to the HDMI terminal 251 via the Ethernet interface 274 and the high-speed data line interface 253. Thus, the IP packet is transmitted to a device at the other end through the HDMI cable connected to the HDMI terminal 251. The IP packet is also sent out to a network if necessary. In this case, the IP packet is output to the network terminal 275 via the Ethernet interface 274. Accordingly, the operation of other devices becomes operable by the remote control transmitter 277 of the TV set 250.

Figure 4:
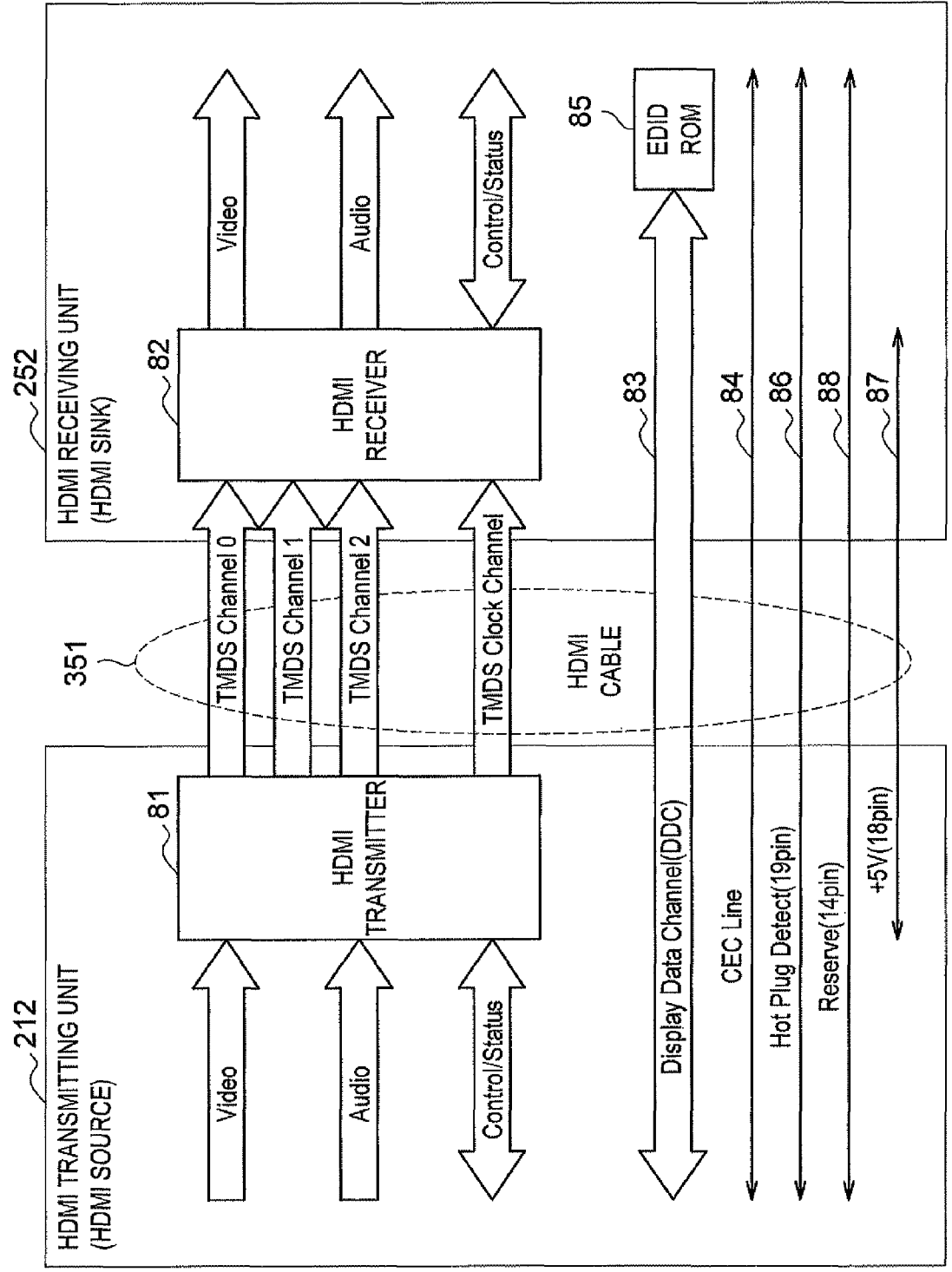
FIG. 4 is a block diagram showing a configuration example of an HDMI transmitting unit (HDMI source) and an HDMI receiving unit (HDMI sink)

FIG. 4 shows a configuration example of the HDMI transmitting unit (HDMI source) 212 of the set top box 210 and the HDMI receiving unit (HDMI sink) 252 of the TV set 250 in the AV system 200 in FIG. 1.

The HDMI source 212 transmits a differential signal corresponding to pixel data of non-compressed images for one screen in an effective image period (hereinafter, also referred to as an active video period when appropriate), which is a period obtained by removing a horizontal retrace period and a vertical retrace period from a period between one vertical synchronizing signal and the next vertical synchronizing signal, to the HDMI sink 252 in one direction by a plurality of channels and also a differential signal corresponding to sound data, control data, or other auxiliary data at least accompanying images in the horizontal retrace period or vertical retrace period to the HDMI sink 252 in one direction by the plurality of channels.

That is, the HDMI source 212 has a transmitter 81. The transmitter 81 converts, for example, pixel data of non-compressed images to a corresponding differential signal and serially transmits the differential signal to the HDMI sink 252 connected via the HDMI cable 351 in one direction by a plurality of, that is, three TMDS channels #0, #1, and #2.

The transmitter 81 also converts sound data accompanying non-compressed images, and further necessary control data and other auxiliary data to a corresponding differential signal and serially transmits the differential signal to the HDMI sink 252 connected via the HDMI cable 351 in one direction by the three TMDS channels #0, #1, and #2.

Further, the transmitter 81 transmits a pixel clock synchronized with pixel data transmitted by the three TMDS channels #0, #1, and #2 to the HDMI sink 252 connected via the HDMI cable 351 by a TMDS clock channel. Here, 10 bits of pixel data are transmitted in one clock of the pixel clock by one TMDS channel #i (i =0, 1, 2).

The HDMI sink 252 receives a differential signal corresponding to pixel data transmitted in one direction from the HDMI source 212 by a plurality of channels in the active video period and also a differential signal corresponding to sound data or control data transmitted in one direction from the HDMI source 212 by the plurality of channels in the horizontal retrace period and the vertical retrace period.

That is, the HDMI sink 252 has a receiver 82. The receiver 82 receives a differential signal corresponding to pixel data and a differential signal corresponding to sound data or control data transmitted in one direction from the HDMI source 212 connected via the HDMI cable 351 by the TMDS channels #0, #1, and #2 in synchronization with the pixel clock transmitted from the HDMI source 212 by the TMDS clock channel in the same way.

Transmission channels of the HDMI system including the HDMI source 212 and the HDMI sink 252 includes, in addition to the three TMDS channels #0, #1, and #2 as transmission channels for serially transmitting image data and sound data in one direction from the HDMI source 212 to the HDMI sink 252 in synchronization with the pixel clock and the TMDS clock channel as a transmission channel for transmitting the pixel clock, transmission channels called a DDC (display data channel) 83 and a CEC line 84.

The DDC 83 includes two signal lines (not shown) contained in the HDMI cable 351 and is used by the HDMI source 212 to read E-EDID (enhanced extended display identification data) from the HDMI sink 252 connected via the HDMI cable 351.

That is, the HDMI sink 252 has, in addition to the HDMI receiver 82, an EDID ROM (read only memory) 85 storing E-EDID, which is performance information about performance (configuration/capability) of the HDMI sink 252. The HDMI source 212 reads via the DDC 83 E-EDID of the HDMI sink 252 from the HDMI sink 252 connected via the HDMI cable 351 and based on the E-EDID, recognizes, for example, formats (profiles) of images with which an electronic device having the HDMI sink 252 complies such as RGB, YCbCr 4:4:4, and YCbCr 4:2:2.

The CEC line 84 includes one signal line (not shown) contained in the HDMI cable 351 and is used for performing bidirectional communication of control data between the HDMI source 212 and the HDMI sink 252.

The HDMI cable 351 also includes a line 86 connected to a pin called HPD (hot plug detect). A source device can detect connection of a sink device by using the line 86. Moreover, the HDMI cable 351 includes a line 87 used for feeding power from a source device to a sink device. Further, the HDMI cable 351 includes a reserved line 88.

Figure 5:
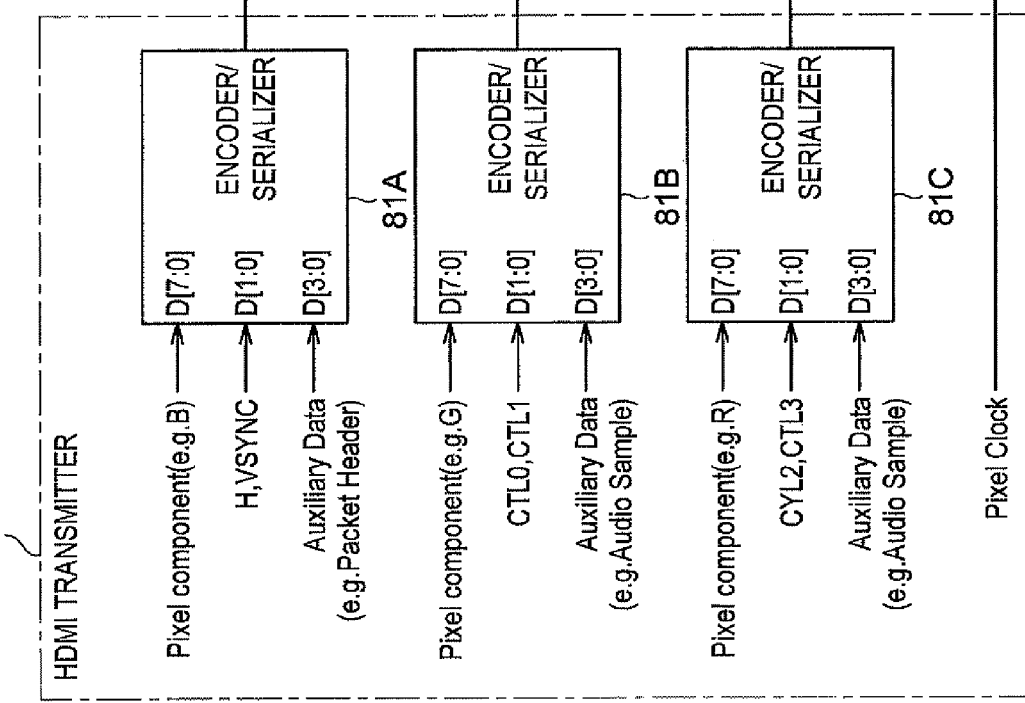
FIG. 5 is a block diagram showing a configuration example of an HDMI transmitter and an HDMI receiver.

FIG. 5 shows a configuration example of the HDMI transmitter 81 and the HDMI receiver 82 in FIG. 4.

The transmitter 81 has three encoders/serializers 81A, 81B, and 81C corresponding to the three TMDS channels #0, #1, and #2 respectively. Then, each of the encoders/serializers 81A, 81B, and 81C encodes image data, auxiliary data, and control data supplied thereto to convert parallel data into serial data for transmission as a differential signal. Here, if image data has, for example, three components of R (red), G (green), and B (blue), the B component is supplied to the encoder/serializer 81A, the G component to the encoder/serializer 81B, and the R component to the encoder/serializer 81C.

The auxiliary data includes, for example, sound data and control packets and control packets are supplied to the encoder/serializer 81A and sound data to the encoders/serializers 81B and 81C.

Further, the control data includes a 1-bit vertical synchronizing signal (VSYNC), a 1-bit horizontal synchronizing signal (HSYNC), and 1-bit control bits CTL0, CTL1, CTL2, and CTL3. The vertical synchronizing signal and the horizontal synchronizing signal are supplied to the encoder/serializer 81A. The control bits CTL0 and CTL1 are supplied to the encoder/serializer 81B and the control bits CTL2 and CTL3 to the encoder/serializer 81C.

The encoder/serializer 81A transmits B components of image data, vertical and the horizontal synchronizing signals, and auxiliary data supplied thereto in time division mode. That is, the encoder/serializer 81A makes B components of image data supplied thereto parallel data in bits 8 bits, which is a fixed number of bits. Further, the parallel data is encoded by the encoder/serializer 81A before being converted into serial data, which is transmitted by the TMDS channel #0.

Also, 2-bit parallel data of vertical and the horizontal synchronizing signals supplied thereto is encoded by the encoder/serializer 81A before being converted into serial data, which is transmitted by the TMDS channel #0. Further, the encoder/serializer 81A makes auxiliary data supplied thereto parallel data in bits 4 bits. Then, the parallel data is encoded by the encoder/serializer 81A before being converted into serial data, which is transmitted by the TMDS channel #0.

The encoder/serializer 81B transmits G components of image data, control bits CTL0 and CTL1, and auxiliary data supplied thereto in time division mode. That is, the encoder/serializer 81B makes G components of image data supplied thereto parallel data in bits 8 bits, which is a fixed number of bits. Further, the parallel data is encoded by the encoder/serializer 81B before being converted into serial data, which is transmitted by the TMDS channel #1.

Also, 2-bit parallel data of control bits CTL0 and CTL1 supplied thereto is encoded by the encoder/serializer 81B before being converted into serial data, which is transmitted by the TMDS channel #1. Further, the encoder/serializer 81B makes auxiliary data supplied thereto parallel data in bits 4 bits. Then, the parallel data is encoded by the encoder/serializer 81B before being converted into serial data, which is transmitted by the TMDS channel #1.

The encoder/serializer 81C transmits R components of image data, control bits CTL2 and CTL3, and auxiliary data supplied thereto in time division mode. That is, the encoder/serializer 81C makes R components of image data supplied thereto parallel data in bits 8 bits, which is a fixed number of bits. Further, the parallel data is encoded by the encoder/serializer 810 before being converted into serial data, which is transmitted by the TMDS channel #2.

Also, 2-bit parallel data of control bits CTL2 and CTL3 supplied thereto is encoded by the encoder/serializer 81C before being converted into serial data, which is transmitted by the TMDS channel #2. Further, the encoder/serializer 81C makes auxiliary data supplied thereto parallel data in bits 4 bits. Then, the parallel data is encoded by the encoder/serializer 810 before being converted into serial data, which is transmitted by the TMDS channel #2.

The receiver 82 has three recovery/decoders 82A, 82B, and 82C corresponding to the three TMDS channels #0, #1, and #2 respectively. Then, each of the recovery/decoders 82A, 82B, and 82C receives image data, auxiliary data, and control data transmitted by the TMDS channels #0, #1, and #2 respectively as a differential signal. Further, image data, auxiliary data, and control data are converted from parallel data into serial data by each of the recovery/decoders 82A, 82B, and 82C before being decoded for output.

That is, the recovery/decoder 82A receives B components of image data, vertical and the horizontal synchronizing signals, and auxiliary data transmitted by the TMDS channel #0 as a differential signal. Then, B components of image data, vertical and the horizontal synchronizing signals, and auxiliary data are converted from parallel data into serial data by the recovery/decoder 82A before being decoded for output.

The recovery/decoder 82B receives G components of image data, control bits CTL0 and CTL1, and auxiliary data transmitted by the TMDS channel #1 as a differential signal. Then, G components of image data, control bits CTL0 and CTL1, and auxiliary data are converted from parallel data into serial data by the recovery/decoder 82B before being decoded for output.

The recovery/decoder 82C receives R components of image data, control bits CTL2 and CTL3, and auxiliary data transmitted by the TMDS channel #2 as a differential signal. Then, R components of image data, control bits CTL2 and CTL3, and auxiliary data are converted from parallel data into serial data by the recovery/decoder 82C before being decoded for output.

Figure 6:
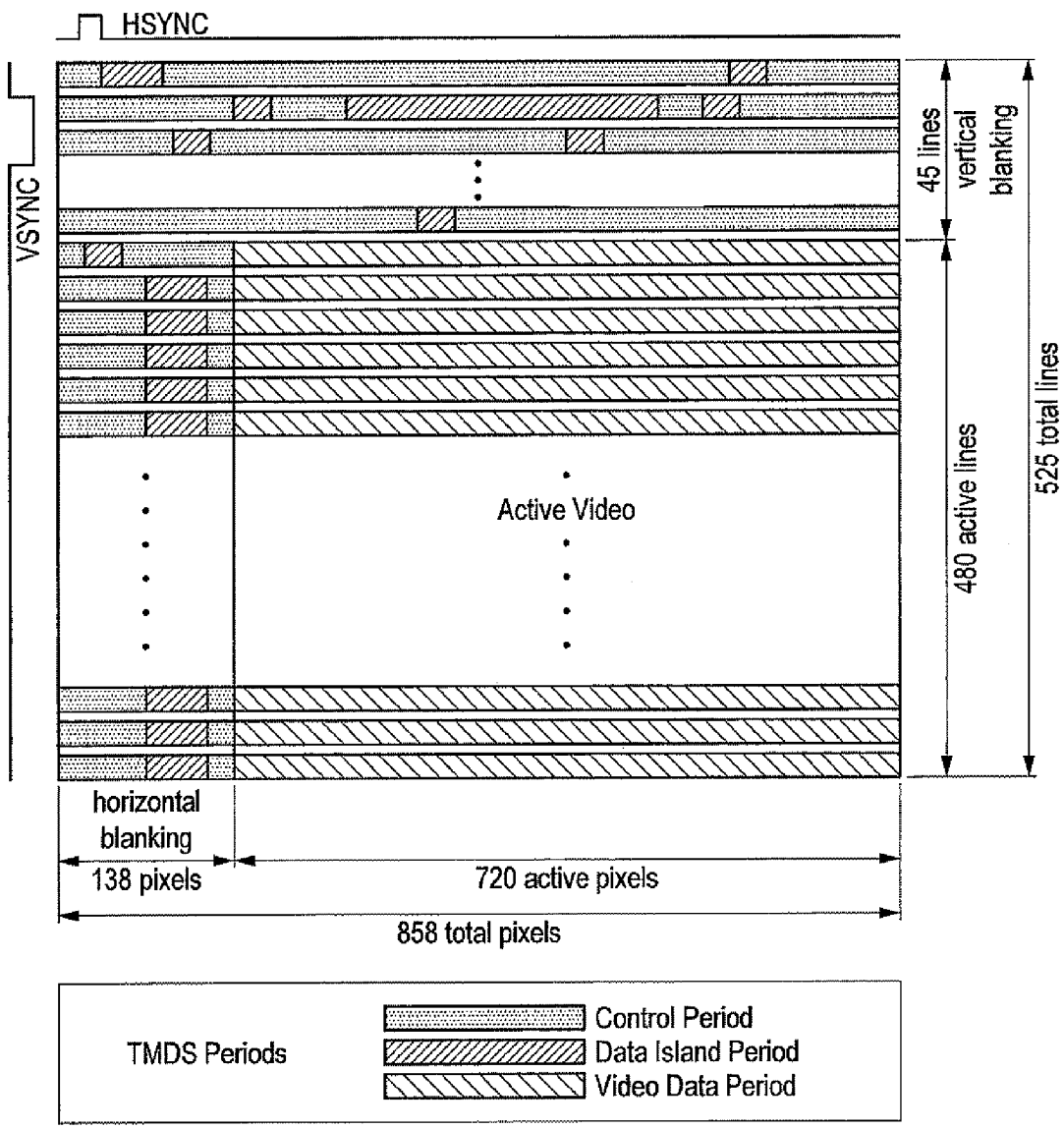
FIG. 6 is a diagram showing a structure of TMDS transmission data.

FIG. 6 shows an example of transmission period in which various types of transmission data are transmitted by the three TMDS channels #0, #1, and #2 of HDMI. Incidentally, FIG. 6 shows a period of various types of transmission data when progressive images of 720×480 pixels horizontally and vertically by the TMDS channels #0, #1, and #2.

In a video field by which transmission data is transmitted by the three TMDS channels #0, #1, and #2 of HDMI, three types of period, that is, a video data period, a data island period, and a control period are present depending on the type of transmission data.

Here, the video field period is a period between an active edge of some vertical synchronizing signal and that of the next vertical synchronizing signal and can be divided into horizontal blanking, vertical blanking, and Active Video, which is a period obtained by eliminating the horizontal blanking and vertical blanking from the video field period.

A video data period is assigned to the Active Video. In the video data period, data of active pixels of 720 pixels×480 lines constituting non-compressed image data for one screen is transmitted.

A data island period and a control period are assigned to the horizontal blanking or vertical blanking. In the data island period and control period, auxiliary data is transmitted.

That is, a data island period is assigned to a portion of the horizontal blanking and vertical blanking. In the data island period, data of auxiliary data not related to control, for example, packets of sound data are transmitted.

A control period is assigned to the other portion of the horizontal blanking and vertical blanking. In the control period, data of auxiliary data related to control, for example, vertical and the horizontal synchronizing signals and control packets are transmitted.

Here, the frequency of the pixel clock transmitted by the TMDS clock channel in the current HDMI is, for example, 165 MHz and in this case, the transmission rate of the data island period is about 500 Mbps.

FIG. 7 shows a pin assignment of HDMI terminals 29 and 31. The pin assignment is called the type A.

Two lines that are differential lines on which TMDS Data#i+ and TMDS Data#i−, which are differential signals of the TMDS channel #1, are transmitted are connected to pins (whose pin numbers are 1, 4, and 7) to which TMDS Data#i+ is assigned and pins (whose pin numbers are 3, 6, and 9) to which TMDS Data#i− is assigned.

The CEC line 84 on which a CEC signal, which is control data, is transmitted is connected to a pin whose pin number is 13 and a pin whose pin number is 14 is a reserved pin. A line on which an SDA (serial data) signal such as E-EDID is transmitted is connected to a pin whose pin number is and a line on which an SCL (serial clock) signal is transmitted is connected to a pin whose pin number is 15. The DDC 83 includes a line on which an SDA signal is transmitted and that on which an SCL signal is transmitted.

The line 86 for detecting connection of a sink device by a source device is connected, as described above, to a pin whose pin number is 19. The line 87 for supplying power is connected, as described above, to a pin whose pin number is 18.

Figure 8:
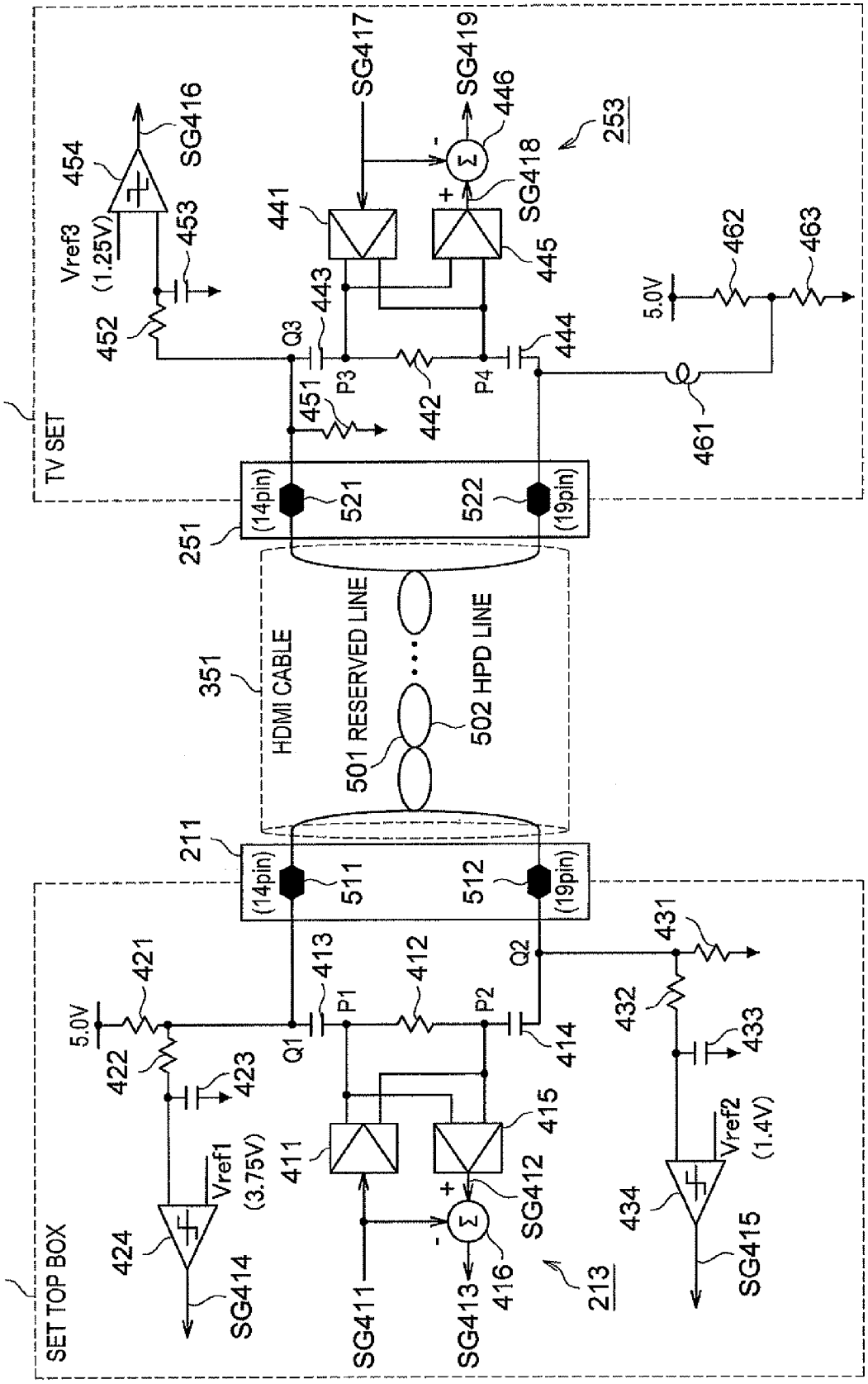
FIG. 8 is a connection diagram showing a configuration example of a high-speed data line interface between a set top box and a TV set.

FIG. 8 shows a configuration example of the high-speed data line interface 213 of the set top box 210 and the high-speed data line interface 253 of the TV set 250 in the AV system 200 in FIG. 1. These interfaces 213 and 253 constitute a communication unit for performing LAN (local area network) communication. The communication unit performs communication by using a bidirectional communication path including, among a plurality of lines constituting the HDMI cable 351, a pair of differential lines, a reserved line (Ether− line) corresponding to a reserved pin (14-pin) in the present embodiment, and an HPD line (Ether+ line) corresponding to an HPD pin (19-pin).

The set top box 210 has a LAN signal transmitting circuit 411, a terminating resistor 412, AC coupling capacitors 413 and 414, a LAN signal receiving circuit 415, a subtracting circuit 416, a pull-up resistor 421, a resistor 422 and a capacitor 423 forming a low-pass filter, a comparator 424, a pull-down resistor 431, a resistor 432 and a capacitor 433 forming a low-pass filter, and a comparator 434. Here, the high-speed data line interface 213 includes the LAN signal transmitting circuit 411, the terminating resistor 412, the AC coupling capacitors 413 and 414, the LAN signal receiving circuit 415, and the subtracting circuit 416.

A series circuit made up of the pull-up resistor 421, the AC coupling capacitor 413, the terminating resistor 412, the AC coupling capacitor 414, and the pull-down resistor 431 is connected to between a power line (+5.0 V) and a ground line. A junction point P1 between the AC coupling capacitor 413 and the terminating resistor 412 is connected to the positive output side of the LAN signal transmitting circuit 411 and also to the positive input side of the LAN signal receiving circuit 415. A junction point P2 between the AC coupling capacitor 414 and the terminating resistor 412 is connected to the negative output side of the LAN signal transmitting circuit 411 and also to the negative input side of the LAN signal receiving circuit 415. A transmission signal (transmission data) SG411 is provided to the input side of the LAN signal transmitting circuit 411.

An output signal SG412 of the LAN signal receiving circuit 415 is supplied to the positive-side terminal of the subtracting circuit 416 and a transmission signal (transmission data) SG411 is supplied to the negative-side terminal of the subtracting circuit 416. In the subtracting circuit 416, the transmission signal SG411 is subtracted from the output signal SG412 of the LAN signal receiving circuit 415 to obtain a received signal (received data) SG413.

A junction point Q1 between the pull-up resistor 421 and the AC coupling capacitor 413 is connected to the ground line via a series circuit made up of the resistor 422 and the capacitor 423. Then, an output signal of the low-pass filter obtained at the junction point between the resistor 422 and the capacitor 423 is supplied to one input terminal of the comparator 424. In the comparator 424, the output signal of the low-pass filter is compared with a reference voltage Vref1 (+3.75 V) supplied to the other input terminal. An output signal SG414 of the comparator 424 is supplied to the CPU 221.

A junction point Q2 between the AC coupling capacitor 414 and the pull-down resistor 431 is connected to the ground line via a series circuit made up of the resistor 432 and the capacitor 433. Then, an output signal of the low-pass filter obtained at the junction point between the resistor 432 and the capacitor 433 is supplied to one input terminal of the comparator 434. In the comparator 434, the output signal of the low-pass filter is compared with a reference voltage Vref2 (+1.4 V) supplied to the other input terminal. An output signal SG415 of the comparator 434 is supplied to the CPU 221.

The TV set 250 has a LAN signal transmitting circuit 441, a terminating resistor 442, AC coupling capacitors 443 and 444, a LAN signal receiving circuit 445, a subtracting circuit 446, a pull-down resistor 451, a resistor 452 and a capacitor 453 forming a low-pass filter, a comparator 454, a choke coil 461, a resistor 462, and a resistor 463. Here, the high-speed data line interface 253 includes the LAN signal transmitting circuit 441, the terminating resistor 442, the AC coupling capacitors 443 and 444, the LAN signal receiving circuit 445, and the subtracting circuit 446.

A series circuit made up of the resistor 462 and the resistor 463 is connected to between a power line (+5.0 V) and a ground line. Then, a series circuit made up of the choke coil 461, the AC coupling capacitor 444, the terminating resistor 442, the AC coupling capacitor 443, and the pull-down resistor 451 is connected to between a junction point between the resistor 462 and the resistor 463 and the ground line.

A junction point P3 between the AC coupling capacitor 443 and the terminating resistor 442 is connected to the positive output side of the LAN signal transmitting circuit 441 and also to the positive input side of the LAN signal receiving circuit 445. A junction point P4 between the AC coupling capacitor 444 and the terminating resistor 442 is connected to the negative output side of the LAN signal transmitting circuit 441 and also to the negative input side of the LAN signal receiving circuit 445. A transmission signal (transmission data) SG417 is provided to the input side of the LAN signal transmitting circuit 441.

An output signal SG418 of the LAN signal receiving circuit 445 is supplied to the positive-side terminal of the subtracting circuit 446 and a transmission signal SG417 is supplied to the negative-side terminal of the subtracting circuit 446. In the subtracting circuit 446, the transmission signal SG417 is subtracted from the output signal SG418 of the LAN signal receiving circuit 445 to obtain a received signal (received data) SG419.

A junction point Q3 between the pull-down resistor 451 and the AC coupling capacitor 443 is connected to the ground line via a series circuit made up of the resistor 452 and the capacitor 453. Then, an output signal of the low-pass filter obtained at the junction point between the resistor 452 and the capacitor 453 is supplied to one input terminal of the comparator 454. In the comparator 454, the output signal of the low-pass filter is compared with a reference voltage Vref3 (+1.25 V) supplied to the other input terminal. An output signal SG416 of the comparator 454 is supplied to the CPU 271.

A reserved line 501 and an HPD line 502 contained in the HDMI cable 351 constitute a differential twisted pair. A source-side end 511 of the reserved line 501 is connected to the 14-pin of the HDMI terminal 211 and a sink-side end 521 of the reserved line 501 is connected to the 14-pin of the HDMI terminal 251. A source-side end 512 of the HPD line 502 is connected to the 19-pin of the HDMI terminal 211 and a sink-side end 522 of the HPD line 502 is connected to the 19-pin of the HDMI terminal 251.

In the set top box 210, the junction point Q1 between the pull-up resistor 421 and the AC coupling capacitor 413 is connected to the 14-pin of the HDMI terminal 211 and the junction point Q2 between the pull-down resistor 431 and the AC coupling capacitor 414 is connected to the 19-pin of the HDMI terminal 211. In the TV set 250, on the other hand, the junction point Q3 between the pull-down resistor 451 and the AC coupling capacitor 443 is connected to the 14-pin of the HDMI terminal 251 and the junction point Q4 between the choke coil 461 and the AC coupling capacitor 444 is connected to the 19-pin of the HDMI terminal 251.

Next, an operation of LAN communication by the high-speed data line interfaces 213 and 253 configured as described above.

In the set top box 210, the transmission signal (transmission data) SG411 is supplied to the input side of the LAN signal transmitting circuit 411 and a differential signal (a positive output signal or negative output signal) corresponding to the transmission signal SG411 is output from the LAN signal transmitting circuit 411. Then, the differential signal output from the LAN signal transmitting circuit 411 is supplied to the junction points P1 and P2 before being transmitted to the TV set 250 through the pair of lines (the reserved line 501 and the HPD line 502) of the HDMI cable 351.

In the TV set 250, the transmission signal (transmission data) SG417 is supplied to the input side of the LAN signal transmitting circuit 441 and a differential signal (a positive output signal or negative output signal) corresponding to the transmission signal SG417 is output from the LAN signal transmitting circuit 441. Then, the differential signal output from the LAN signal transmitting circuit 441 is supplied to the junction points P3 and P4 before being transmitted to the set top box 210 through the pair of lines (the reserved line 501 and the HPD line 502) of the HDMI cable 351.

Also in the set top box 210, the input side of the LAN signal receiving circuit 415 is connected to the junction points P1 and P2 and thus, an added signal of a transmission signal corresponding to a differential signal (current signal) output from the LAN signal transmitting circuit 411 and a received signal corresponding to the differential signal transmitted from the TV set 250 as described above is obtained as the output signal SG412 of the LAN signal receiving circuit 415. In the subtracting circuit 416, the transmission signal SG411 is subtracted from the output signal SG412 of the LAN signal receiving circuit 415. Therefore, the output signal SG413 of the subtracting circuit 416 corresponds to the transmission signal (transmission data) SG417 of the TV set 250.

Also in the TV set 250, the input side of the LAN signal receiving circuit 445 is connected to the junction points P3 and P4 and thus, an added signal of a transmission signal corresponding to a differential signal (current signal) output from the LAN signal transmitting circuit 441 and a received signal corresponding to the differential signal transmitted from the set top box 210 as described above is obtained as the output signal SG418 of the LAN signal receiving circuit 445. In the subtracting circuit 446, the transmission signal SG417 is subtracted from the output signal SG418 of the LAN signal receiving circuit 445. Therefore, the output signal SG419 of the subtracting circuit 446 corresponds to the transmission signal (transmission data) SG411 of the set top box 210.

In this manner, LAN communication in both directions can be performed between the high-speed data line interface 213 of the set top box 210 and the high-speed data line interface 253 of the TV set 250.

In FIG. 8, in addition to the LAN communication, the HPD line 502 notifies the set top box 210 that the HDMI cable 351 has been connected to the TV set 250 at a DC bias level. That is, the resistors 462 and 463 and the choke coil 461 inside the TV set 250 bias the HPD line 502 to about 4 V via the 19-pin of the HDMI terminal 251 when the HDMI cable 351 is connected to the TV set 250. The set top box 210 extracts the DC bias of the HPD line 502 by the low-pass filter including the resistor 432 and the capacitor 433 and compares the DC bias with the reference voltage Vref2 (for example, 1.4 V) by the comparator 434.

The voltage of the 19-pin of the HDMI terminal 211 is lower than the reference voltage Vref2 when the HDMI cable 351 is not connected to the TV set 250 because of the presence of the pull-down resistor 431. Conversely, the voltage of the 19-pin is higher when the HDMI cable 351 is connected to the TV set 250. Therefore, the output signal SG415 of the comparator 434 at a high level when the HDMI cable 351 is connected to the TV set 250 and at a low level when the HDMI cable 351 is not connected. Accordingly, the CPU 221 of the set top box 210 can recognize whether or not the HDMI cable 351 is connected to the TV set 250 based on the output signal SG415 of the comparator 434.

Also in FIG. 8, devices connected to both ends of the HDMI cable 351 at a DC bias potential have a function to mutually recognize whether a LAN-communication enabled device (hereinafter, referred to as an "e-HDMI compatible device") or a LAN-communication disabled device (hereinafter, referred to as an "e-HDMI incompatible device").

As described above, the set top box 210 pulls up (+5 V) the reserved line 501 by the resistor 421 and the TV set 250 pulls down the reserved line 501 by the resistor 451. The resistors 421 and 451 are not present in an e-HDMI incompatible device.

In the set top box 210, as described above, a DC potential of the reserved line 501 after passing through the low-pass filter including the resistor 422 and the capacitor 423 is compared with the reference voltage Vref1 by the comparator 424. If the TV set 250 is an e-HDMI compatible device and the pull-down resistor 451 is present, the voltage of the reserved line 501 becomes 2.5 V. However, if the TV set 250 is an e-HDMI incompatible device and the pull-down resistor 451 is not present, the voltage of the reserved line 501 becomes 5 V in the presence of the pull-up resistor 421.

Thus, with the reference voltage Vref1 set, for example, to 3.75 V, the output signal SG414 of the comparator 424 is at a low level if the TV set 250 is an e-HDMI compatible device and at a high level if the TV set 250 is an e-HDMI incompatible device. Accordingly, the CPU 221 of the set top box 210 can recognize whether the TV set 250 is an e-HDMI compatible device based on the output signal SG414 of the comparator 424.

Similarly, in the TV set 250, as described above, a DC potential of the reserved line 501 after passing through the low-pass filter including the resistor 452 and the capacitor 453 is compared with the reference voltage Vref3 by the comparator 454. If the set top box 210 is an e-HDMI compatible device and the pull-up resistor 421 is present, the voltage of the reserved line 501 becomes 2.5 V. However, if the set top box 210 is an e-HDMI incompatible device and the pull-up resistor 421 is not present, the voltage of the reserved line 501 becomes 0 V in the presence of the pull-down resistor 451.

Thus, with the reference voltage Vref3 set, for example, to 1.25 V, the output signal SG416 of the comparator 454 is at a high level if the set top box 210 is an e-HDMI compatible device and at a low level if the set top box 210 is an e-HDMI incompatible device. Accordingly, the CPU 271 of the TV set 250 can recognize whether the set top box 210 is an e-HDMI compatible device based on the output signal SG416 of the comparator 454.

According to the configuration example shown in FIG. 8, in an interface in which data transmission of video and sound, exchange and authentication of connected device information, communication of device control data, and LAN communication are performed by one HDMI cable 351, LAN communication is performed by bidirectional communication via a pair of differential transmission paths and a connected state of the interface is notified by a DC bias potential of at least one of transmission paths and therefore, spatial separation can be implemented in which the SCL line and the SDA line are physically not used for LAN communication. As a result, a circuit for LAN communication can be formed due to the separation regardless of electrical specifications specified for DDC, realizing stable and reliable LAN communication at low cost.

The pull-up resistor 421 shown in FIG. 8 may be provided inside the HDMI cable 351, instead of inside the set top box 210. In such a case, each terminal of the pull-up resistor 421 is connected, among lines provided inside the HDMI cable 351, to the reserved line 501 and a line (signal line) connected to the power supply (power supply potential).

Further, the pull-down resistor 451 and the resistor 463 shown in FIG. 8 may be provided inside the HDMI cable 351, instead of inside the TV set 250. In such a case, each terminal of the pull-down resistor 451 is connected, among lines provided inside the HDMI cable 351, to the reserved line 501 and a line (ground line) connected to the ground (reference potential). Each terminal of the resistor 463 is connected, among lines provided inside the HDMI cable 351, to the HPD line 502 and a line (ground line) connected to the ground (reference potential).

Figure 9:
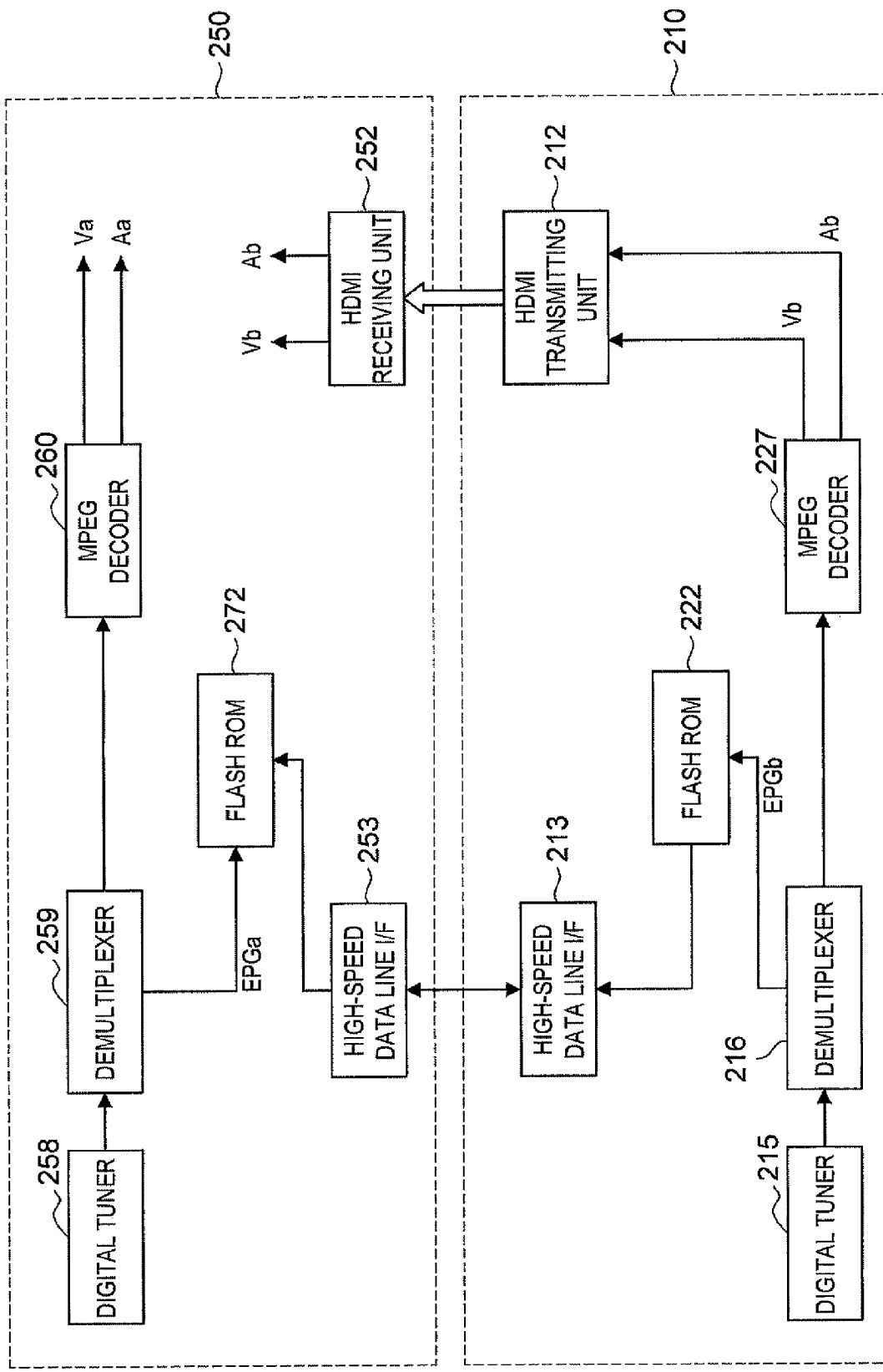
FIG. 9 is a diagram describing an operation example of the AV system.

Next, operation examples of the AV system 200 shown in FIG. 1 will be described with reference to FIG. 9.

In the TV set 250, a transport stream extracted by the digital tuner 258 is supplied to the demultiplexer 259. In the demultiplexer 259, a partial TS (TS packets of video data and those of sound data) of a predetermined program is extracted from the transport stream.

The partial TS extracted by the demultiplexer 259 is supplied to the MPEG decoder 260. The MPEG decoder 260 performs decode processing on video PES packets including TS packets of video data to obtain video (image) data Va. The MPEG decoder 260 also performs decode processing on sound PES packets including TS packets of sound data to obtain sound data Aa.

Also, electronic program information EPGa is extracted from a predetermined transport stream extracted by the digital tuner 258 in the demultiplexer 259. The electronic program information EPGa is supplied to the flash ROM 272 to be stored.

In the set top box 210, a transport stream extracted by the digital tuner 215 is supplied to the demultiplexer 216. In the demultiplexer 216, a partial TS (TS packets of video data and those of sound data) of a predetermined program is extracted from the transport stream.

The partial TS extracted by the demultiplexer 216 is supplied to the MPEG decoder 227. The MPEG decoder 227 performs decode processing on video PES packets including TS packets of video data to obtain video (image) data Vb.

The MPEG decoder 227 also performs decode processing on sound PES packets including TS packets of sound data to obtain sound data Ab.

The video (image) data Vb and the sound data Ab obtained by the MPEG decoder 227 are supplied to the HDMI transmitting unit 212 before being transmitted to the TV set 250 via TMDS channels of HDMI. In the TV set 250, the video (image) data Vb and the sound data Ab transmitted from the set top box 210 via the TMDS channels of HDMI are received by the HDMI receiving unit 252.

In the TV set 250 in the above state, the video (image) data Va and the sound data Aa obtained by the MPEG decoder 260 or the video (image) data Vb and the sound data Ab received by the HDMI receiving unit 252 are selected so that the image display and sound output by the selected video (image) data and sound data becomes possible. Incidentally, images by the video data Va and those by the video data Vb can also be simultaneously displayed side by side.

In the set top box 210, electronic program information EPGb is extracted from a predetermined transport stream extracted by the digital tuner 215 in the demultiplexer 216. The electronic program information EPGb is supplied to and stored in the flash ROM 222.

The electronic program information EPGb stored in the flash ROM 222 is supplied to the high-speed data line interface 213 as transmission data before being transmitted to the TV set 250 via a high-speed data line (bidirectional communication path). In the TV set 250, the electronic program information EPGb transmitted from the set top box 210 via the high-speed data line is received by the high-speed data line interface 253. Then, the electronic program information EPGb is supplied to the flash ROM 272 to be stored.

Thus, the set top box 210 transmits the electronic program information EPGb to the TV set 250 when, for example, a transmission request is transmitted from the TV set 250 to the set top box 210 via a control data line (CEC line) or high-speed data line. When, for example, a user operates the remote control transmitter 277 to provide instructions to display a program guide, the TV set 250 transmits the above transmission request to the set top box 210.

In the TV set 250 in the above state, a program guide PGLa including information about programs receivable by the TV set 250 and a program guide PGLb including information about programs receivable by the set top box 210 can be displayed on the display panel 263. The program guide is displayed based on user instructions from the remote control transmitter 277 under control of the CPU 271. In this case, one of the program guide PGLa and the program guide PGLb or both can be displayed.

When the program guide PGLa should be displayed, the CPU 271 reads the electronic program information EPGa from the flash ROM 272 and based on the electronic program information EPGa, creates graphic data to display the program guide PGLa. Then, the CPU 271 causes the video/graphic processing circuit 261 to superimpose the graphic data of the program guide PGLa on video (image) data.

In a state in which the program guide PGLa is displayed, as described above, the user can operate the remote control transmitter 277 to select a program to be received by the TV set 250 or set to receive for recording from the program guide PGLb. The CPU 271 controls a tuning operation in the digital tuner 258 and the demultiplexer 259 based on the operation information of the user.

Also when the program guide PGLb should be displayed, the CPU 271 reads the electronic program information EPGb from the flash ROM 272 and based on the electronic program information EPGb, creates graphic data to display the program guide PGLb. Then, the CPU 271 causes the video/graphic processing circuit 261 to superimpose the graphic data of the program guide PGLb on video (image) data.

In a state in which the program guide PGLb is displayed, as described above, the user can operate the remote control transmitter 277 to select a program to be received by the set top box 210 or set to receive for recording from the program guide PGLb. In this case, an IP packet containing operation information (remote control code) of the user is generated by the CPU 271. Then, the IP packet is supplied to the high-speed data line interface 253 through the Ethernet interface 274 as transmission data before being transmitted to the set top box 210 via the high-speed data line (bidirectional communication path).

In the set top box 210, the IP packet containing operation information (remote control code) of the user transmitted from the TV set 250 via the high-speed data line is received by the high-speed data line interface 213 and the IP packet is supplied to the CPU 221 through the Ethernet interface 224. Then, the CPU 221 controls a tuning operation in the digital tuner 215 and the demultiplexer 216 based on the operation information of the user.

The above operation information of the user constitutes control information of the set top box 210. Such control information can be transmitted, as described above, by a high-speed data line, but may also be transmitted by using a control data line (CEC line).

When the program guides PGLa and PGLb should be displayed simultaneously, the CPU 271 reads the electronic program information EPGa and EPGb from the flash ROM 272 and based on the electronic program information EPGa and EPGb, creates graphic data to display the program guides PGLa and PGLb simultaneously. Then, the CPU 271 causes the video/graphic processing circuit 261 to superimpose the graphic data of the program guides PGLa and PGLb on video (image) data.

In a state in which the program guides PGLa and PGLb are displayed simultaneously, as described above, the user can operate the remote control transmitter 277 to select a program to be received by the TV set 250 or the set top box 210 or set to receive for recording from the program guides PGLa and PGLb respectively.

Figure 10:
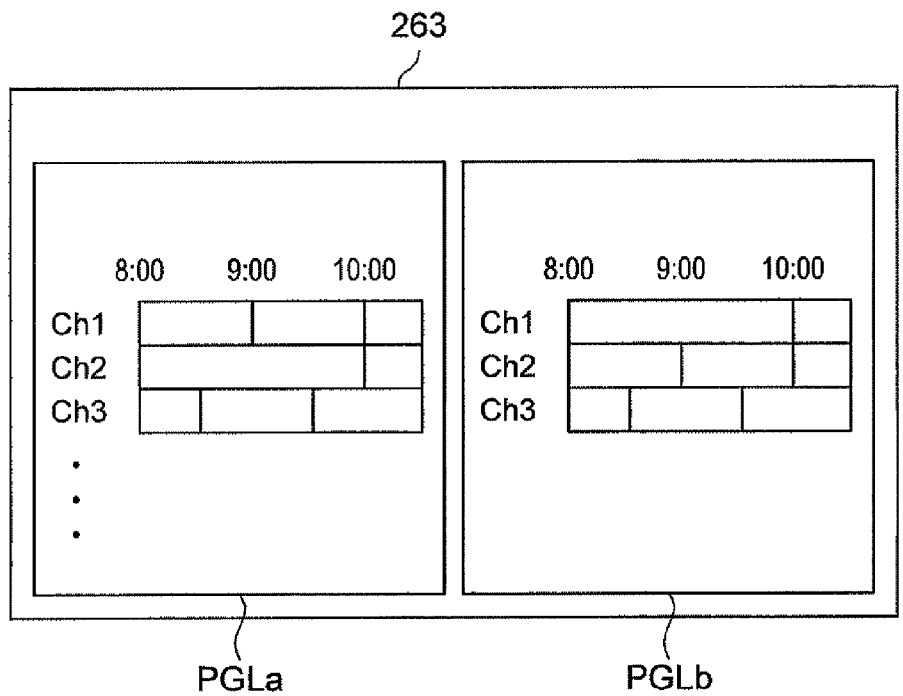
FIG. 10 is a diagram showing a display example when a program guide PGLa (a program guide of programs that can be received by a TV set) and a program guide PGLb (a program guide of programs that can be received by a set top box) are simultaneously displayed on a display panel.

FIG. 10 shows a display example when the program guide PGLa (a program guide of programs that can be received by the TV set 250) and the program guide PGLb (a program guide of programs that can be received by the set top box 210) are simultaneously displayed on the display panel 263. In this display example, the program guide PGLa and the program guide PGLb are displayed side by side in a horizontal direction.

Figure 11:
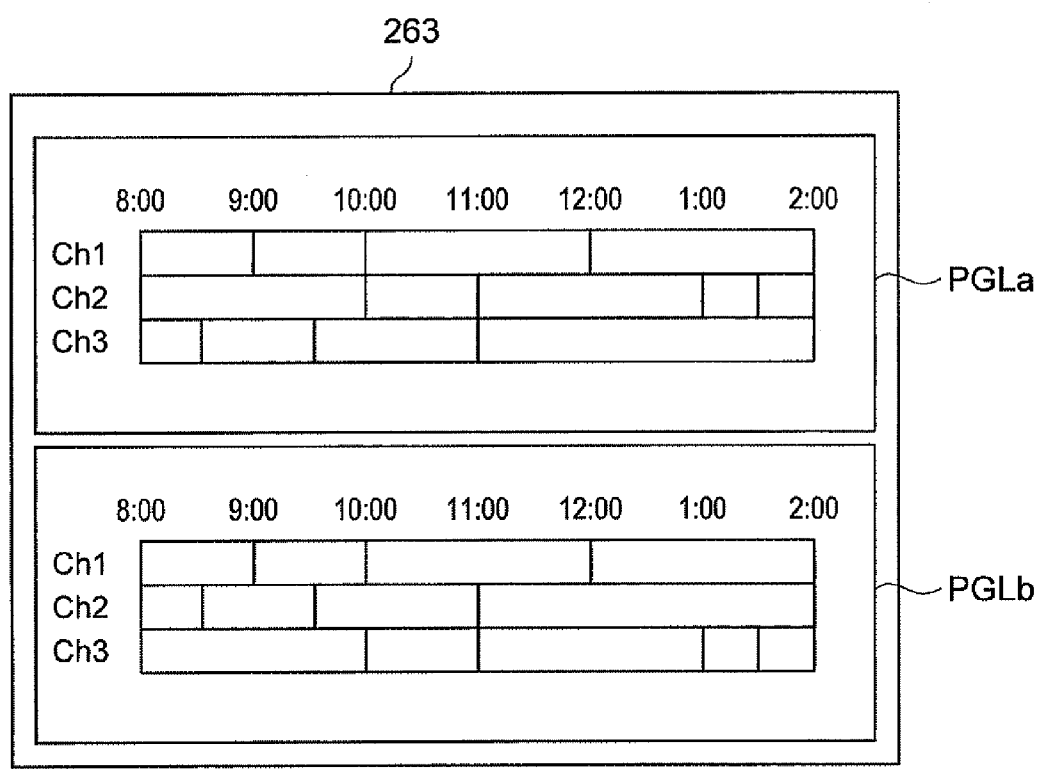
FIG. 11 is a diagram showing another display example when the program guide PGLa and the program guide PGLb are simultaneously displayed on the display panel.

FIG. 11 shows another display example when the program guide PGLa and the program guide PGLb are simultaneously displayed on the display panel 263. In this display example, the program guide PGLa and the program guide PGLb are displayed side by side in a vertical direction.

Figure 12:
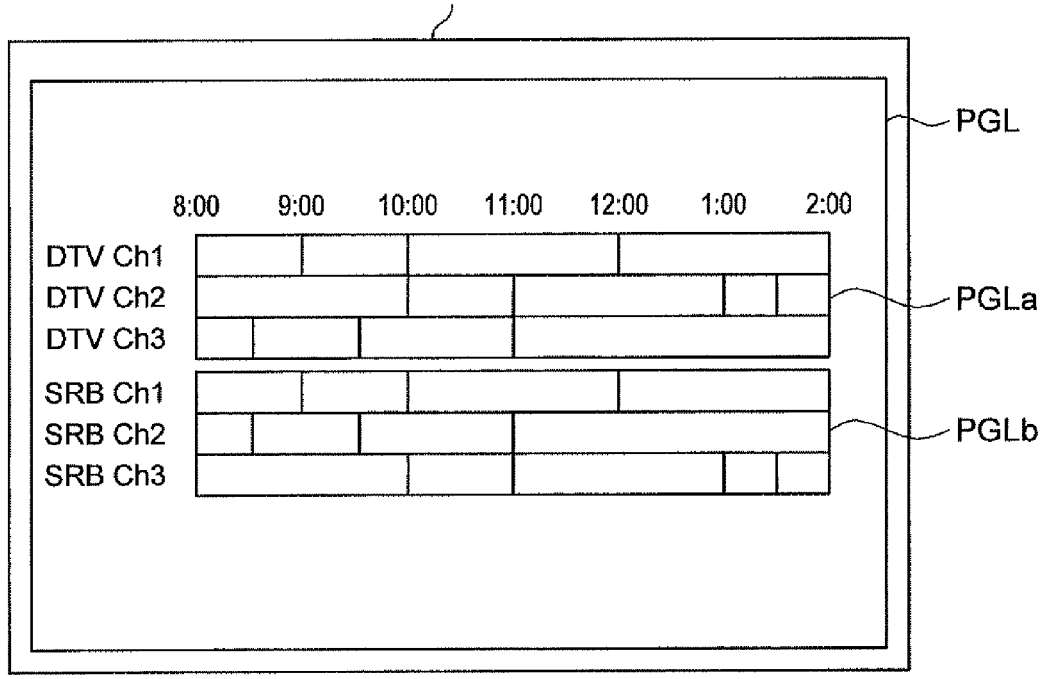
FIG. 12 is a diagram showing another display example when the program guide PGLa and the program guide PGLb are simultaneously displayed on the display panel.

FIG. 12 shows another display example when the program guide PGLa and the program guide PGLb are simultaneously displayed on the display panel 263. In this display example, the program guide PGLa and the program guide PGLb are displayed in the same program guide PGL.

Figure 13:
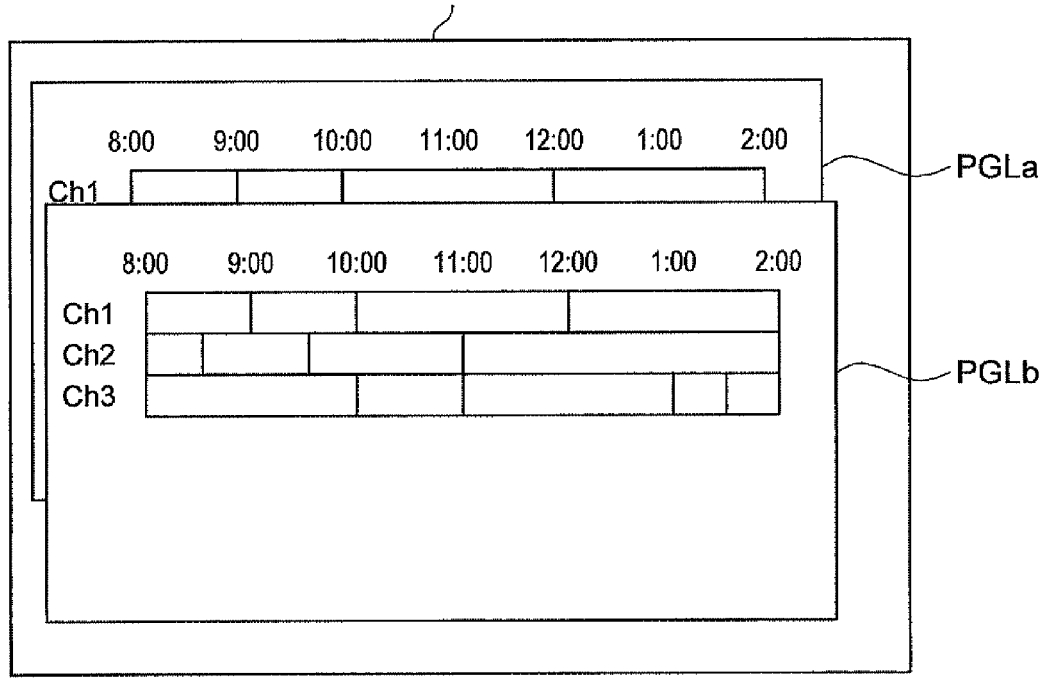
FIG. 13 is a diagram showing still another display example when the program guide PGLa and the program guide PGLb are simultaneously displayed on the display panel.

FIG. 13 shows still another display example when the program guide PGLa and the program guide PGLb are simultaneously displayed on the display panel 263. In this display example, the program guide PGLa and the program guide PGLb are displayed in an overlapped state. In the case of this display example, the program guide PGLa and the program guide PGLb can be interchanged in the overlapped state by user instructions from the remote control transmitter 277.

Figure 14:
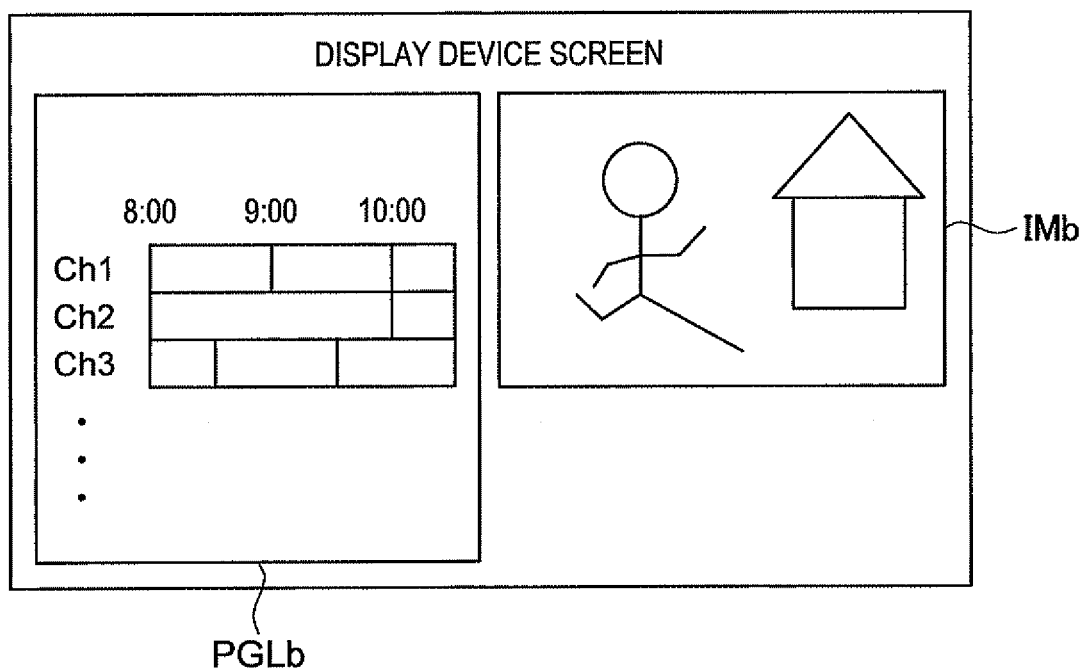
FIG. 14 is a diagram showing a display example when only the program guide PGLb (a program guide of programs that can be received by the set top box) is displayed on the display panel.

FIG. 14 shows a display example when only the program guide PGLb (a program guide of programs that can be received by the set top box 210) is displayed on the display panel 263. In this display example, an image IMb from video (image) data transmitted from the set top box 210 by the TDMS channel of HDMI is displayed alongside the program guide PGLb. By displaying the program guide PGLb and the image IMb side by side in this manner, user convenience is increased. That is, when the user operates the remote control transmitter 277 to select a desired program from the program guide PGLb, the user can immediately check content of the selected program by viewing the image IMb.

As described above, in the AV system 200 shown in FIG. 1, in addition to being able to receive baseband (non-compressed) video (images) data and sound data from the set top box 210 using the TDMS channel of HDMI, the TV set 250 can receive electronic program information (EPG information) from the set top box 210 using the high-speed data line (bidirectional communication path). Therefore, the program guide PGLb showing programs receivable by the set top box 210 can be displayed on the display panel 263 of the TV set 250 so that program selection, setting for program recording and the like of the set top box 210 can be controlled by using the program guide PGLb.

In the AV system 200 shown in FIG. 1, the communication unit (communication path) performing bidirectional communication is configured by a reserved line (Ether− line) and an HPD line (Ether+ line) of HDMI cable, but the configuration of the communication unit performing bidirectional communication is not limited to this. Other configuration examples will be described below. In the following examples, the set top box 210 is assumed to be a source device and the TV set 250 as a sink device.

Figure 15:
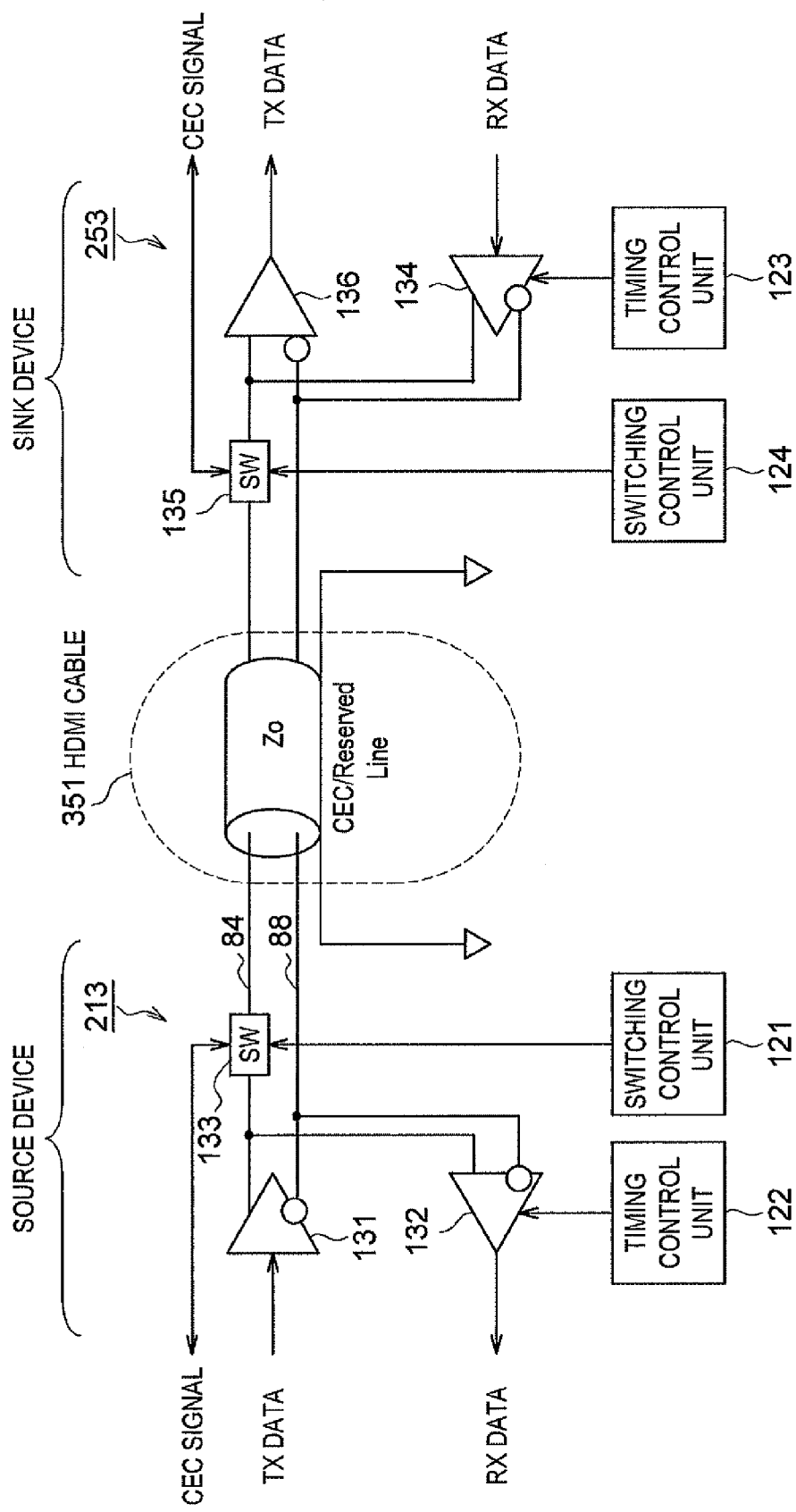
FIG. 15 is a connection diagram showing another configuration example of the high-speed data line interface between the set top box and the TV set.

FIG. 15 is an example in which the CEC line 84 and the reserved line 88 are used to perform IP communication by the half-duplex communication method. In FIG. 15, the same reference numerals are attached to corresponding units in FIG. 4 and a description thereof is omitted when deemed appropriate.

The high-speed data line interface 213 of the source device has a conversion unit 131, a decoding unit 132, a switch 133, a switching control unit 121 and a timing control unit 122. Tx data, which is data transmitted from the source device to the sink device, is supplied to the conversion unit 131 by IP communication in both directions between the source device and sink device.

The conversion unit 131 is constructed of, for example, a differential amplifier and converts the supplied Tx data into a differential signal having two partial signals. The conversion unit 131 also transmits the differential signal obtained by conversion to the sink device via the CEC line 84 and the reserved line 88. That is, the conversion unit 131 supplies one partial signal constituting the differential signal obtained by conversion to the switch 133 via the CEC line 84, more specifically, via a signal line provided in the source device and connected to the CEC line of the HDMI cable 351 and the other partial signal constituting the differential signal to the sink device via the reserved line 88, more specifically, via a signal line provided in the source device and connected to the reserved line 88 of the HDMI cable 351 and the reserved line 88.

The decoding unit 132 is constructed of, for example, a differential amplifier and input terminals thereof are connected to the CEC line 84 and the reserved line 88. The decoding unit 132 receives based on control of the timing control unit 122 a differential signal transmitted from the sink device via the CEC line 84 and the reserved line 88, that is, a differential signal having a partial signal on the CEC line 84 and that on the reserved line 88 and decodes the differential signal into Rx data, which is original data, before outputting the Rx data. Here, Rx data is data transmitted from the sink device to the source device by IP communication in both directions between the source device and sink device.

When data is transmitted, a CEC signal from the control unit (CPU) of the source device or a partial signal constituting a differential signal corresponding to Tx data from the conversion unit 131 is supplied to the switch 133. When data is received, a CEC signal from the sink device or a partial signal constituting a differential signal corresponding to Rx data from the sink device is supplied to the switch 133. The switch 133 selectively outputs a CEC signal from the control unit (CPU) or a CEC signal from the sink device, or a partial signal constituting a differential signal corresponding to Tx data or a partial signal constituting a differential signal corresponding to Rx data based on control from the switching control unit 121.

That is, the switch 133 selects one of a CEC signal supplied from the control unit (CPU) and a partial signal supplied from the conversion unit 131 when the source device transmits data to the sink device and transmits the selected CEC signal or partial signal to the sink device via the CEC line 84.

The switch 133 also selects a CEC signal transmitted from the sink device via the CEC line 84 or a partial signal of a differential signal corresponding to Rx data when the source device receives data transmitted from the sink device and supplies the received CEC signal or partial signal to the control unit (CPU) or the decoding unit 132.

The switching control unit 121 controls the switch 133 to change the switch 133 in such a way that one of signals supplied to the switch 133 is selected. The timing control unit 122 controls timing for receiving a differential signal by the decoding unit 132.

The high-speed data line interface 253 of the sink device has a conversion unit 134, a decoding unit 136, a switch 135, a switching control unit 124 and a timing control unit 123. The conversion unit 134 is constructed of, for example, a differential amplifier and Rx data is supplied to the conversion unit 134. The conversion unit 134 converts the supplied Rx data into a differential signal having two partial signals based on control of the timing control unit 123 and transmits the differential signal obtained by conversion to the source device via the CEC line 84 and the reserved line 88.

That is, the conversion unit 134 supplies one partial signal constituting the differential signal obtained by conversion to the switch 135 via the CEC line 84, more specifically, via a signal line provided in the sink device and connected to the CEC line 84 of the HDMI cable 351 and the other partial signal constituting the differential signal to the source device via the reserved line 88, more specifically, via a signal line provided in the sink device and connected to the reserved line 88 of the HDMI cable 351 and the reserved line 88.

When data is received, a CEC signal from the source device or a partial signal constituting a differential signal corresponding to Tx data from the source device is supplied to the switch 135. When data is transmitted, a partial signal constituting a differential signal corresponding to Rx data from the conversion unit 134 or a CEC signal from the control unit (CPU) of the sink device is supplied to the switch 135. The switch 135 selectively outputs a CEC signal from the source device or that from the control unit (CPU), or a partial signal constituting a differential signal corresponding to Tx data or that constituting a differential signal corresponding to Rx data based on control from the switching control unit 124.

That is, the switch 135 selects one of a CEC signal supplied from the control unit (CPU) of the sink device and a partial signal supplied from the conversion unit 134 when the sink device transmits data to the source device and transmits the selected CEC signal or partial signal to the source device via the CEC line 84.

The switch 135 also selects a CEC signal transmitted from the source device via the CEC line 84 or a partial signal of a differential signal corresponding to Tx data when the sink device receives data transmitted from the source device and supplies the received CEC signal or partial signal to the control unit (CPU) or the decoding unit 136.

The decoding unit 136 is constructed of, for example, a differential amplifier and input terminals thereof are connected to the CEC line 84 and the reserved line 88. The decoding unit 136 receives a differential signal transmitted from the source device via the CEC line 84 and the reserved line 88, that is, a differential signal having a partial signal on the CEC line 84 and that on the reserved line 88 and decodes the differential signal into Tx data, which is original data, before outputting the Tx data.

The switching control unit 124 controls the switch 135 to change the switch 135 in such a way that one of signals supplied to the switch 135 is selected. The timing control unit 123 controls timing for transmitting a differential signal by the conversion unit 134.

Figure 16:
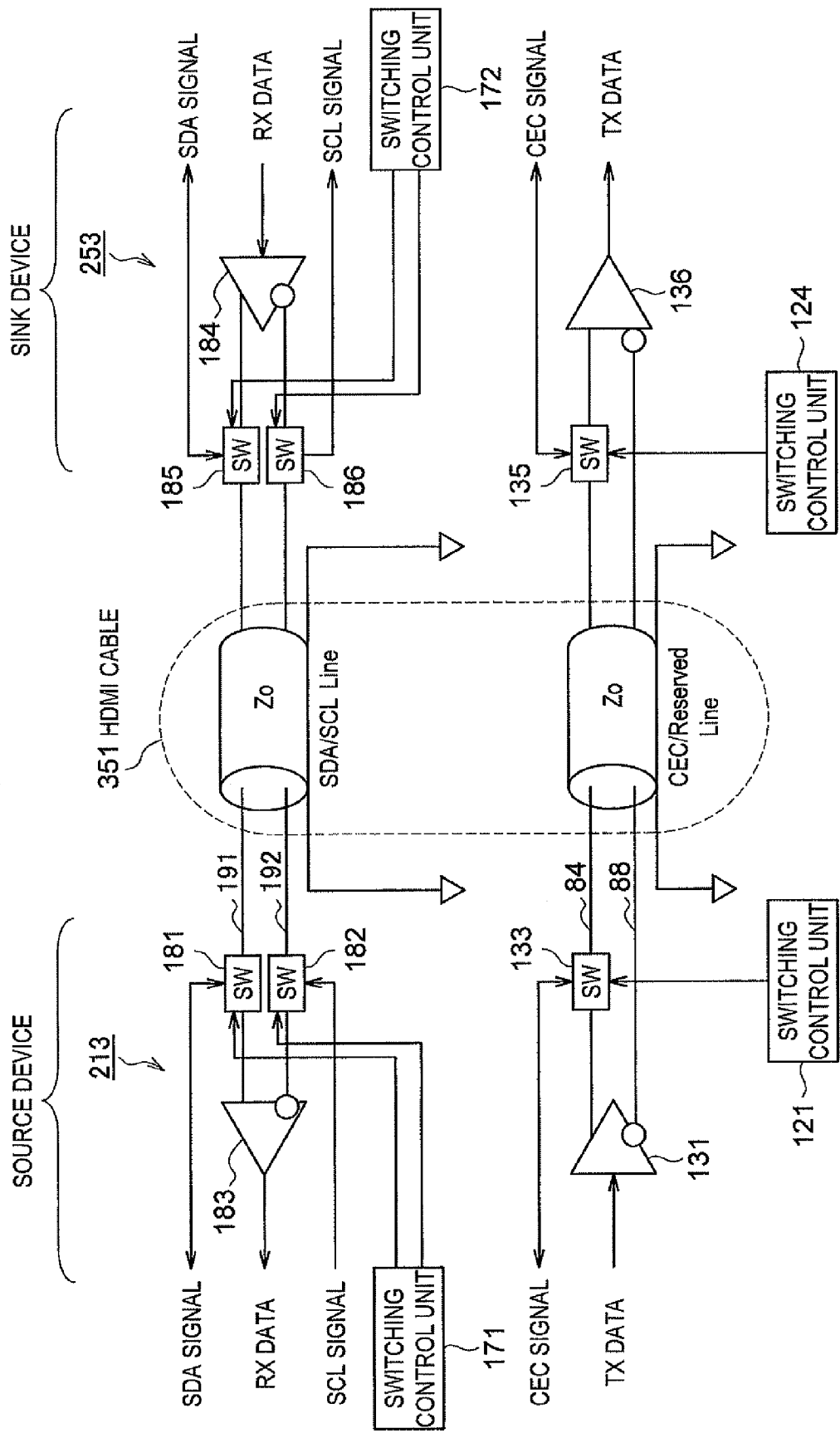
FIG. 16 is a connection diagram showing still another configuration example of the high-speed data line interface between the set top box and the TV set.

FIG. 16 is an example in which the CEC line 84 and the reserved line 88, and also a signal line (SDA line) on which an SDA signal is transmitted and a signal line (SCL) on which an SCL signal is transmitted are used to perform IP communication by the full-duplex communication method. In FIG. 16, the same reference numerals are attached to corresponding units in FIG. 15 and a description thereof is omitted when deemed appropriate.

The high-speed data line interface 213 of the source device has the conversion unit 131, the switch 133, a switch 181, a switch 182, a decoding unit 183, the switching control unit 121 and a switching control unit 171.

When data is transmitted, an SDA signal from the control unit (CPU) of the source device is supplied to the switch 181. When data is received, an SDA signal from the sink device or a partial signal constituting a differential signal corresponding to Rx data from the sink device is supplied to the switch 181. The switch 181 selectively outputs an SDA signal from the control unit (CPU), that from the sink device, or a partial signal constituting a differential signal corresponding to Rx data based on control from the switching control unit 171.

That is, when the source device receives data transmitted from the sink device, the switch 181 receives an SDA signal transmitted from the sink device via an SDA line 191, which is a signal line on which an SDA signal is transmitted, or a partial signal of a differential signal corresponding to Rx data and supplies the received SDA signal or partial signal to the control unit (CPU) or the decoding unit 183.

When the source device transmits data to the sink device, the switch 181 also transmits the SDA signal supplied from the control unit (CPU) to the sink device via the SDA line 191 or transmits nothing.

When data is transmitted, an SCL signal from the control unit (CPU) of the source device is supplied to the switch 182. When data is received, a partial signal constituting a differential signal corresponding to Rx data from the sink device is supplied to the switch 182. The switch 182 selectively outputs one of an SCL signal and a partial signal constituting a differential signal corresponding to Rx data based on control from the switching control unit 171.

That is, when the source device receives data transmitted from the sink device, the switch 182 receives a partial signal of a differential signal corresponding to Rx data transmitted from the sink device via an SCL line 192, which is a signal line on which an SCL signal is transmitted, and supplies the received partial signal to the decoding unit 183 or receives nothing.

When the source device transmits data to the sink device, the switch 182 also transmits the SCL signal supplied from the control unit (CPU) of the source device to the sink device via the SCL line 192 or transmits nothing.

The decoding unit 183 is constructed of, for example, a differential amplifier and input terminals thereof are connected to the SDA line 191 and the SCL line 192. The decoding unit 183 receives a differential signal transmitted from the sink device via the SDA line 191 and the SCL line 192, that is, a differential signal having a partial signal on the SDA line 191 and a partial signal on the SCL line 192 and decodes the differential signal into Rx data, which is original data, before outputting the Rx data.

The switching control unit 171 controls the switch 181 and the switch 182 to change the switch 181 and the switch 182 in such a way that one of signals supplied to each of the switch 181 and the switch 182 is selected.

The high-speed data line interface 253 of the sink device has a conversion unit 184, the switch 135, a switch 185, a switch 186, the decoding unit 136, a switching control unit 172 and the switching control unit 124.

The conversion unit 184 is constructed of, for example, a differential amplifier and Rx data is supplied to the conversion unit 184. The conversion unit 184 converts the supplied Rx data into a differential signal having two partial signals and transmits the differential signal obtained by conversion to the source device via the SDA line 191 and the SCL line 192. That is, the conversion unit 184 transmits one partial signal constituting the differential signal obtained by conversion to the source device via the switch 185 and the other partial signal constituting the differential signal to the source device via the switch 186.

When data is transmitted, a partial signal constituting a differential signal corresponding to Rx data from the conversion unit 184 or an SDA signal from the control unit (CPU) of the sink device is supplied to the switch 185. When data is received, an SDA signal from the source device is supplied to the switch 185. The switch 185 selectively outputs an SDA signal from the control unit (CPU), an SDA signal from the source device, or a partial signal constituting a differential signal corresponding to Rx data based on control from the switching control unit 172.

That is, when the sink device receives data transmitted from the source device, the switch 185 receives an SDA signal transmitted from the source device via the SDA line 191 and supplies the received SDA signal to the control unit (CPU) or transmits nothing.

When the sink device transmits data to the source device, the switch 185 transmits the SDA signal supplied from the control unit (CPU) or the partial signal supplied from the conversion unit 184 to the source device via the SDA line 191.

When data is transmitted, a partial signal constituting a differential signal corresponding to Rx data from the conversion unit 184 is supplied to the switch 186. When data is received, an SCL signal from the source device is supplied to the switch 186. The switch 186 selectively outputs a partial signal constituting a differential signal corresponding to Rx data or an SCL signal based on control from the switching control unit 172.

That is, when the sink device receives data transmitted from the source device, the switch 186 receives an SCL signal transmitted from the source device via the SCL line 192 and supplies the received SCL signal to the control unit (CPU) or transmits nothing.

When the sink device transmits data to the source device, the switch 186 transmits a partial signal supplied from the conversion unit 184 to the source device via the SCL line 192.

The switching control unit 172 controls the switch 185 and the switch 186 to change the switch 181 and the switch 182 in such a way that one of signals supplied to each of the switch 181 and the switch 182 is selected.

Incidentally, when a source device and a sink device perform IP communication, whether half-duplex communication or full-duplex communication is possible is determined by the configuration of the source device and that of the sink device. Thus, the source device references E-EDID received from the sink device to determine whether to perform half-duplex communication or full-duplex communication, or bidirectional communication based on exchanges of CEC signals.

Figure 17:
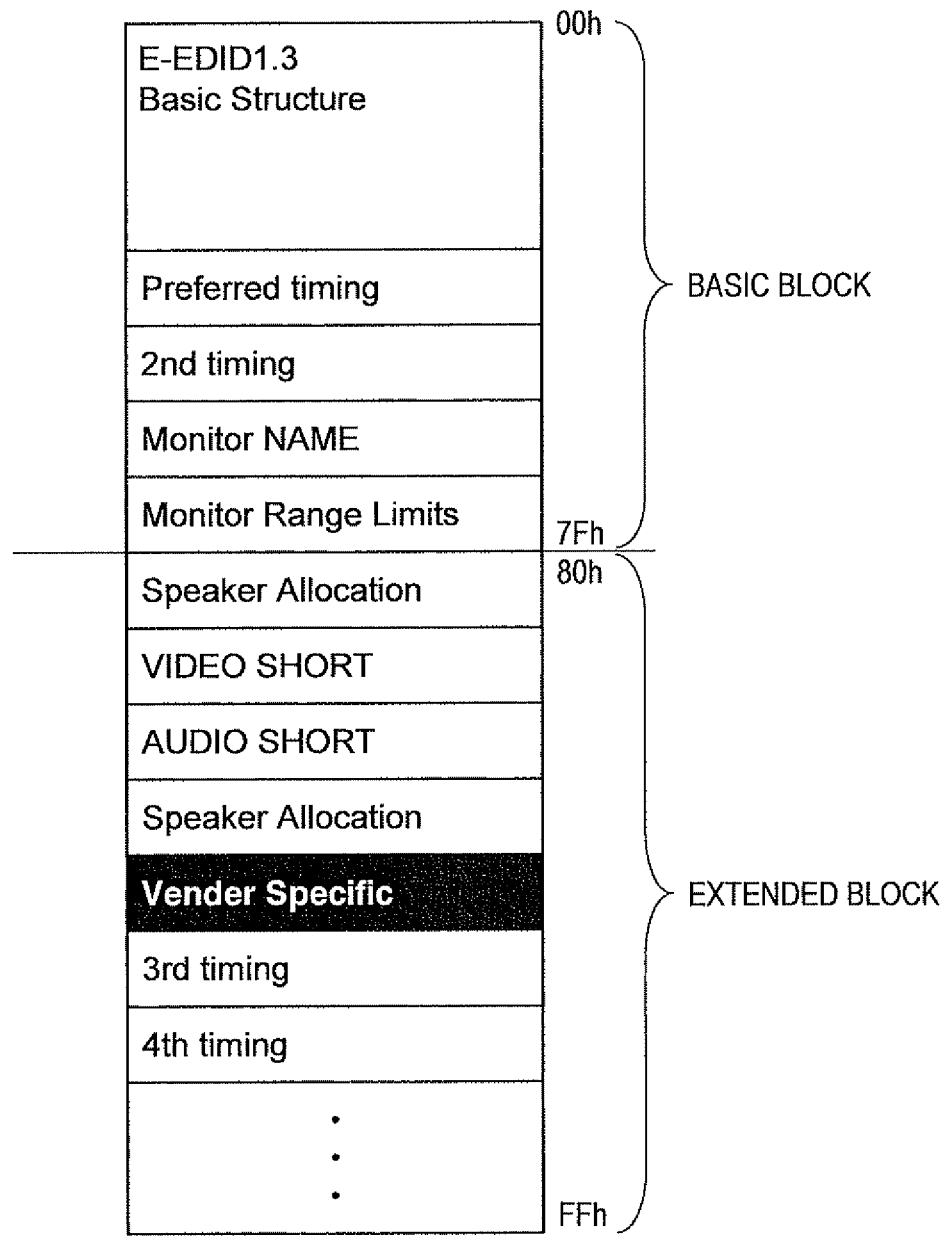
FIG. 17 is a diagram showing an E-EDID structure received by the source device.

As shown, for example, in FIG. 17, E-EDID received by the source device has a basic block and an extended block.

Data specified by the E-EDID 1.3 standard represented by "E-EDID 1.3 Basic Structure" is placed at the start of the basic block of E-EDID. Then, timing information represented by "Preferred timing" to be compatible with EDID in related art and timing information represented by "2nd timing" that is different from "Preferred timing" to be compatible with EDID in related art are placed.

In the basic block, after "2nd timing", information showing the name of the display device represented by "Monitor NAME" and information represented by "Monitor Range Limits" to show numbers of pixels that can be displayed when the aspect ratios are 4:3 and 16:9 are placed in order.

On the other hand, information about speakers on the right and left sides represented by "Speaker Allocation" is placed at the start of the extended block and then, data represented by "VIDEO SHORT" in which information such as image sizes that can be displayed, frame rates, whether interlaced or progressive, and the aspect ratio and the like are described, data represented by "AUDIO SHORT" in which information such as reproducible sound codec methods, sampling frequencies, cutoff areas, and numbers of codec bits, and information about speakers on the right and left sides represented by "Speaker Allocation" are placed in order.

In the extended block, after "Speaker Allocation", data defined specifically for each manufacturer represented by "Vendor Specific", timing information represented by "3rd timing" to be compatible with EDID in related art, and timing information represented by "4th timing" to be compatible with EDID in related art are placed.

Further, data represented by "Vendor Specific" has a data structure as shown in FIG. 18. That is, data represented by "Vendor Specific" has 0-th block to N-th block that are 1-byte blocks provided therein.

In the 0-th block placed at the start of data represented by "Vendor Specific", the header showing the data area of data "Vendor Specific" represented by "Vendor-Specific tag code (=3)" and information showing the length of data "Vendor Specific" represented by "Length (=N)" are placed.

In the 1st block to the 3rd block, information showing the number "0x000003" registered for HDMI (R) represented by "24bit IEEE Registration Identifier (0x000003) LSB first" is placed. Further, in the 4th block and the 5th block, information showing 24-bit physical addresses of sink devices represented by "A", "B", "C", and "D" is placed.

In the 6th block, the flag showing a function supported by the sink device represented by "Supports-AI", information specifying the number of bits per pixel represented by each of "DC-48bit", "DC-36bit", and "DC-30bit", the flag showing whether the sink device supports transmission of images of YCbCr 4:4:4 represented by "DC-Y444", and the flag showing whether the sink device supports dual DVI (digital visual interface) represented by "DVI-Dual" are placed.

In the 7th block, information showing the max frequency of the pixel block of TMDS represented by "Max-TMDS-Clock" is placed. Further, in the 8th block, the flag showing presence/absence of delay information of video and sound represented by "Latency", the full-duplex flag showing whether full-duplex communication is possible represented by "Full Duplex", and the half-duplex flag showing whether half-duplex communication is possible represented by "Half Duplex" are placed.

Here, for example, the set (for example, set to "1") full-duplex flag shows that the sink device has a function to perform full-duplex communication, that is, the configuration shown FIG. 16 is provided and the reset (for example, set to "0") full-duplex flag shows that the sink device has no function to perform full-duplex communication.

Similarly, the set (for example, set to "1") half-duplex flag shows that the sink device has a function to perform half-duplex communication, that is, the configuration shown FIG. 15 is provided and the reset (for example, set to "0") half-duplex flag shows that the sink device has no function to perform half-duplex communication.

In the 9th block of data represented by "Vendor Specific", delay time data of progressive video represented by "Video Latency" is placed and in the 10th block, delay time data of sound accompanying progressive video represented by "Audio Latency" is placed. Further, in the 11th block, delay time data of interlaced video represented by "Interlaced Video Latency" is placed and in the 12th block, delay time data of sound accompanying interlaced video represented by "Interlaced Audio Latency" is placed.

The source device determines whether to perform half-duplex communication or full-duplex communication, or bidirectional communication based on exchanges of CEC signals based on the full-duplex flag and the half-duplex flag contained in E-EDID received from the sink device and performs communication in both directions based on the determination result.

If, for example, the source device has the configuration shown in FIG. 15, the source device can perform half-duplex communication with the sink device shown in FIG. 15, but can hardly perform half-duplex communication with the sink device shown in FIG. 16. Thus, the source device starts communication processing when the source device is turned on and performs communication in both directions in accordance with a function of the sink device connected to the source device.

Figure 19:
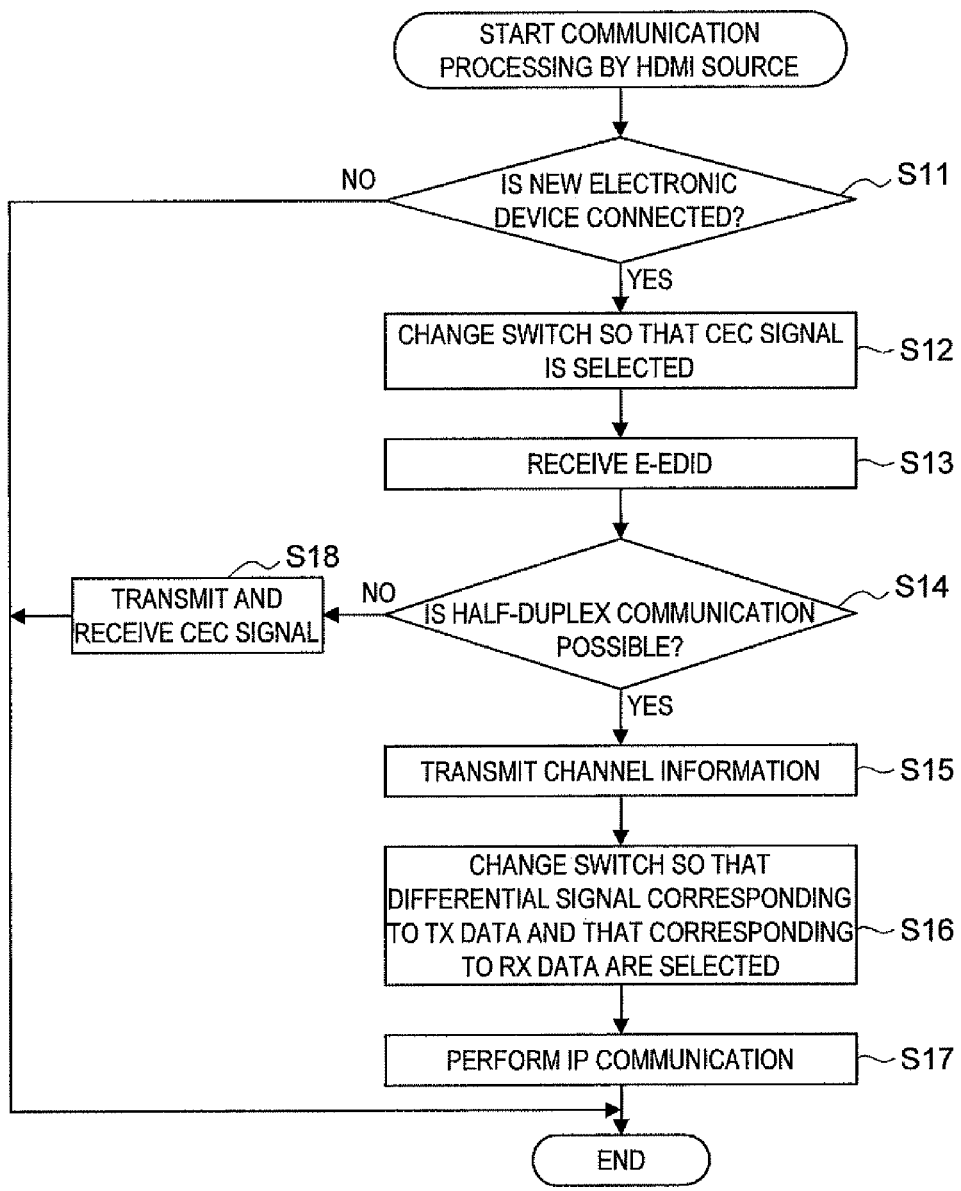
FIG. 19 is a flowchart describing communication processing by the source device.

The flow chart in FIG. 19 is referenced below to describe communication processing by the source device shown in FIG. 15.

At step S11, the source device determines whether a new electronic device is connected to the source device. The source device determines whether a new electronic device (sink device) is connected, for example, based on the magnitude of voltage applied to the pin called Hot Plug Detect to which the HPD line 86 is connected.

If determined at step S11 that no new electronic device is connected, communication is not performed and thus, communication processing ends. In contrast, if determined at step S11 that a new electronic device is connected, at step S12, the switching control unit 121 controls the switch 133 to change the switch 133 in such a way that a CEC signal from the control unit (CPU) of the source device is selected while data is transmitted and that from the sink device is selected while data is received.

At step S13, the source device receives E-EDID transmitted from the sink device via the DDC 83. That is, when the sink device detects connection of a source device, the sink device reads E-EDID from the EDID ROM 85 and transmits the read E-EDID to the source device via the DDC 83 and therefore, the source device receives E-EDID transmitted from the sink device.

At step S14, the source device determines whether half-duplex communication with the sink device is possible. That is, the source device references E-EDID received from the sink device to determine whether or not the half-duplex flag "Half Duplex" in FIG. 18 is set. If, for example, the half-duplex flag is set, the source device determines that IP communication in both directions by the half-duplex communication method, that is, half-duplex communication is possible.

If determined at step S14 that half-duplex communication is possible, at step S15, the source device transmits a signal indicating that IP communication by the half-duplex communication method will be performed by using the CEC line 84 and the reserved line 88 to the sink device via the switch 133 and the CEC line 84 as channel information showing channels to be used for communication in both directions.

That is, if the half-duplex flag is set, the source device knows that the sink device has the configuration shown in FIG. 15 and half-duplex communication using the CEC line 84 and the reserved line 88 can be performed and thus, the source device notifies that half-duplex communication will be performed by transmitting channel information to the sink device.

At step S16, the switching control unit 121 controls the switch 133 to change the switch 133 in such a way that a differential signal corresponding to Tx data from the conversion unit 131 is selected while data is transmitted and a differential signal corresponding to Rx data from the sink device is selected while data is received.

At step S17, each unit of the source device performs IP communication in both directions with the sink device by the half-duplex communication method, thereby ending communication processing. That is, while data is transmitted, the conversion unit 131 converts Tx data supplied from the control unit (CPU) into a differential signal and supplies one partial signal constituting the differential signal obtained by conversion to the switch 133 and transmits the other partial signal to the sink device via the reserved line 88. The switch 133 transmits the partial signal supplied from the conversion unit 131 to the sink device via the CEC line 84. Accordingly, the differential signal corresponding to Tx data is transmitted from the source device to the sink device.

Also while data is received, the decoding unit 132 receives a differential signal corresponding to Rx data transmitted from the sink device. That is, the switch 133 receives a partial signal of the differential signal corresponding to Rx data transmitted from the sink device via the CEC line 84 and supplies the received partial signal to the decoding unit 132. The decoding unit 132 decodes a differential signal having the partial signal supplied from the switch 133 and that supplied from the sink device via the reserved line 88 into Rx data, which is original data, based on control of the timing control unit 122 before outputting the Rx data to the control unit (CPU).

Accordingly, the source device exchanges various kinds of data such as control data, image data, and sound data with the sink device.

If determined at step S14 that half-duplex communication is hard to perform, at step S18, the source device performs communication in both directions with the sink device by transmitting and receiving CEC signals before ending communication processing.

That is, the source device exchanges control data with the sink device by transmitting a CEC signal to the sink device via the switch 133 and the CEC line 84 while data is transmitted and receiving a CEC signal transmitted from the sink device via the switch 133 and the CEC line 84 while data is received.

In this manner, the source device references the half-duplex flag and performs half-duplex communication with a sink device with which half-duplex communication can be performed using the CEC line 84 and the reserved line 88.

Thus, high-speed bidirectional communication can be performed while maintaining compatibility with HDMI in related art by selecting data to be transmitted and that to be received by changing the switch 133 and performing half-duplex communication using the CEC line 84 and the reserved line with the sink device, that is, IP communication by the half-duplex communication method.

Similar to the source device, the sink device also starts communication processing when the sink device is turned on to perform communication with the source device in both directions.

Figure 20:
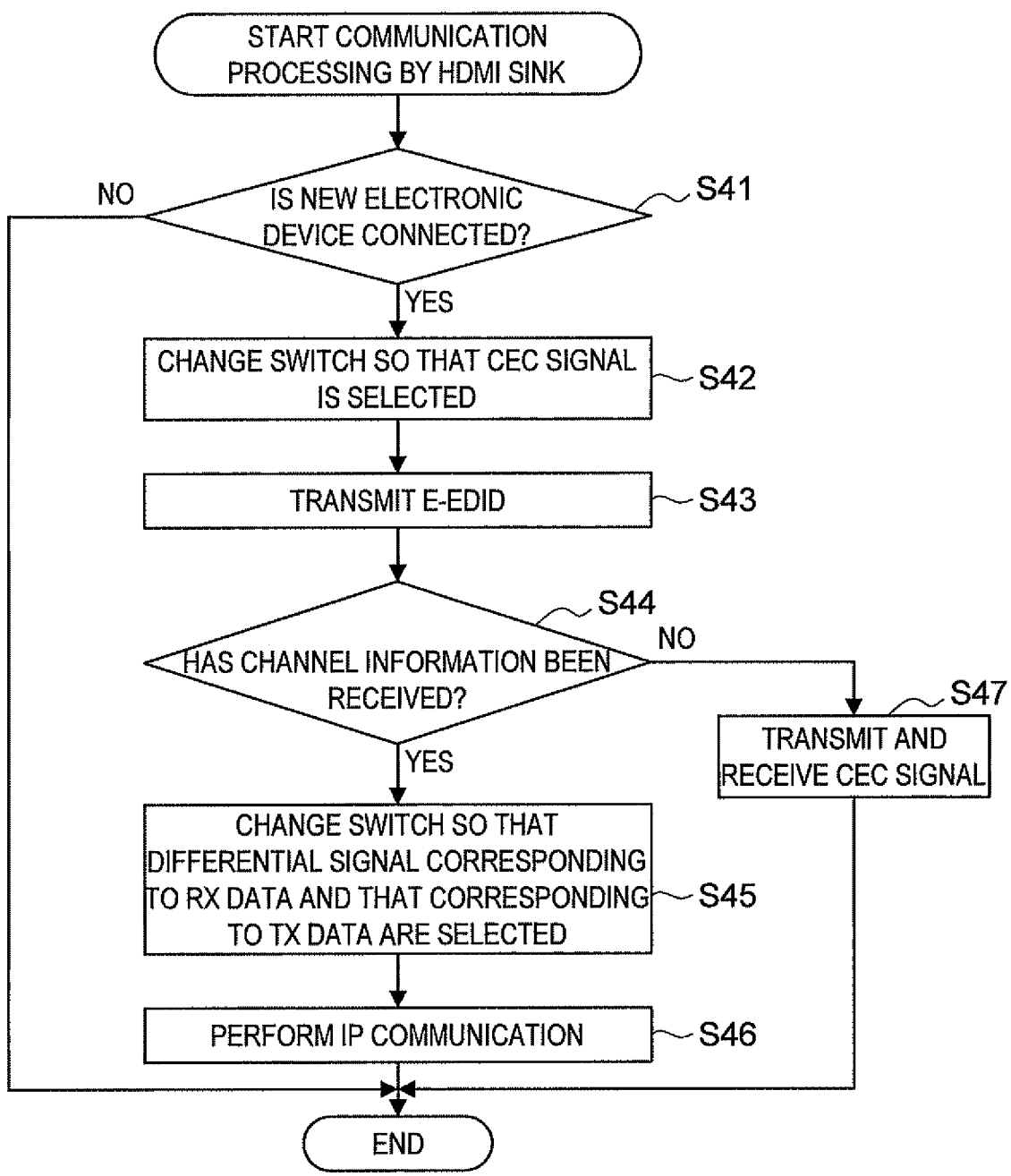
FIG. 20 is a flowchart describing communication processing by the sink device.

The flow chart in FIG. 20 is referenced below to describe communication processing by the sink device shown in FIG. 15.

At step S41, the sink device determines whether a new electronic device (source device) is connected to the sink device. The sink device determines whether a new electronic device is connected, for example, based on the magnitude of voltage applied to the pin called Hot Plug Detect to which the HPD line 86 is connected.

If determined at step S41 that no new electronic device is connected, communication is not performed and thus, communication processing ends. In contrast, if determined at step S41 that a new electronic device is connected, at step S42, the switching control unit 124 controls the switch 135 to change the switch 135 in such a way that a CEC signal from the control unit (CPU) of the sink device is selected while data is transmitted and a CEC signal from the source device is selected while data is received.

At step S43, the sink device reads E-EDID from the EDID ROM 85 and transmits the read E-EDID to the source device via the DDC 83.

At step S44, the sink device determines whether channel information transmitted from the source device has been received.

That is, channel information indicating channels of communication in both directions in accordance with functions of the source device and sink device is transmitted from the source device. If, for example, the source device is configured as shown in FIG. 15, the source device and sink device can perform half-duplex communication using the CEC line 84 and the reserved line 88. Thus, channel information notifying that IP communication using the CEC line 84 and the reserved line 88 will be performed is transmitted from the source device to the sink device. The sink device receives the channel information transmitted from the source device via the switch 135 and the CEC line 84 and determines that channel information has been received.

If, on the other hand, the source device does not have a function to perform half-duplex communication, channel information is not transmitted from the source device to the sink device and thus, the sink device determines that channel information has not been received.

If determined at step S44 that channel information has been received, processing proceeds to step S45 and the switching control unit 124 controls the switch 135 to change the switch 135 in such a way that a differential signal corresponding to Rx data from the conversion unit 134 is selected while data is transmitted and a differential signal corresponding to Tx data from the source device is selected while data is received.

At step S46, the sink device performs IP communication in both directions with the source device by the half-duplex communication method, thereby ending communication processing. That is, while data is transmitted, the conversion unit 134 converts Rx data supplied from the control unit (CPU) of the sink device into a differential signal and supplies one partial signal constituting the differential signal obtained by conversion to the switch 135 and transmits the other partial signal to the source device via the reserved line 88. The switch 135 transmits the partial signal supplied from the conversion unit 134 to the source device via the CEC line 84. Accordingly, the differential signal corresponding to Rx data is transmitted from the sink device to the source device.

Also while data is received, the decoding unit 136 receives a differential signal corresponding to Tx data transmitted from the source device. That is, the switch 135 receives a partial signal of the differential signal corresponding to Tx data transmitted from the source device via the CEC line 84 and supplies the received partial signal to the decoding unit 136. The decoding unit 136 decodes a differential signal having the partial signal supplied from the switch 135 and a differential signal supplied from the source device via the reserved line 88 into Tx data, which is original data, before outputting the Tx data to the control unit (CPU).

Accordingly, the sink device exchanges various kinds of data such as control data, pixel data, and sound data with the source device.

If determined at step S44 that channel information has not been received, at step S47, the sink device performs communication in both directions with the source device by transmitting and receiving CEC signals before ending communication processing.

That is, the sink device exchanges control data with the source device by transmitting a CEC signal to the source device via the switch 135 and the CEC line 84 while data is transmitted and receiving a CEC signal transmitted from the source device via the switch 135 and the CEC line 84 while data is received.

In this manner, after receiving channel information, the sink device performs half-duplex communication with the source device by using the CEC line 84 and the reserved line 88.

Thus, the sink device can perform high-speed bidirectional communication while maintaining compatibility with HDMI in related art by selecting data to be transmitted and that to be received by changing the switch 135 and performing half-duplex communication with the source device using the CEC line 84 and the reserved line 88.

If the source device has the configuration shown in FIG. 16, the source device determines in communication processing whether the sink device has a function to perform full-duplex communication based on the full-duplex flag contained in E-EDID and performs communication in both directions based on the determination result.

Figure 21:
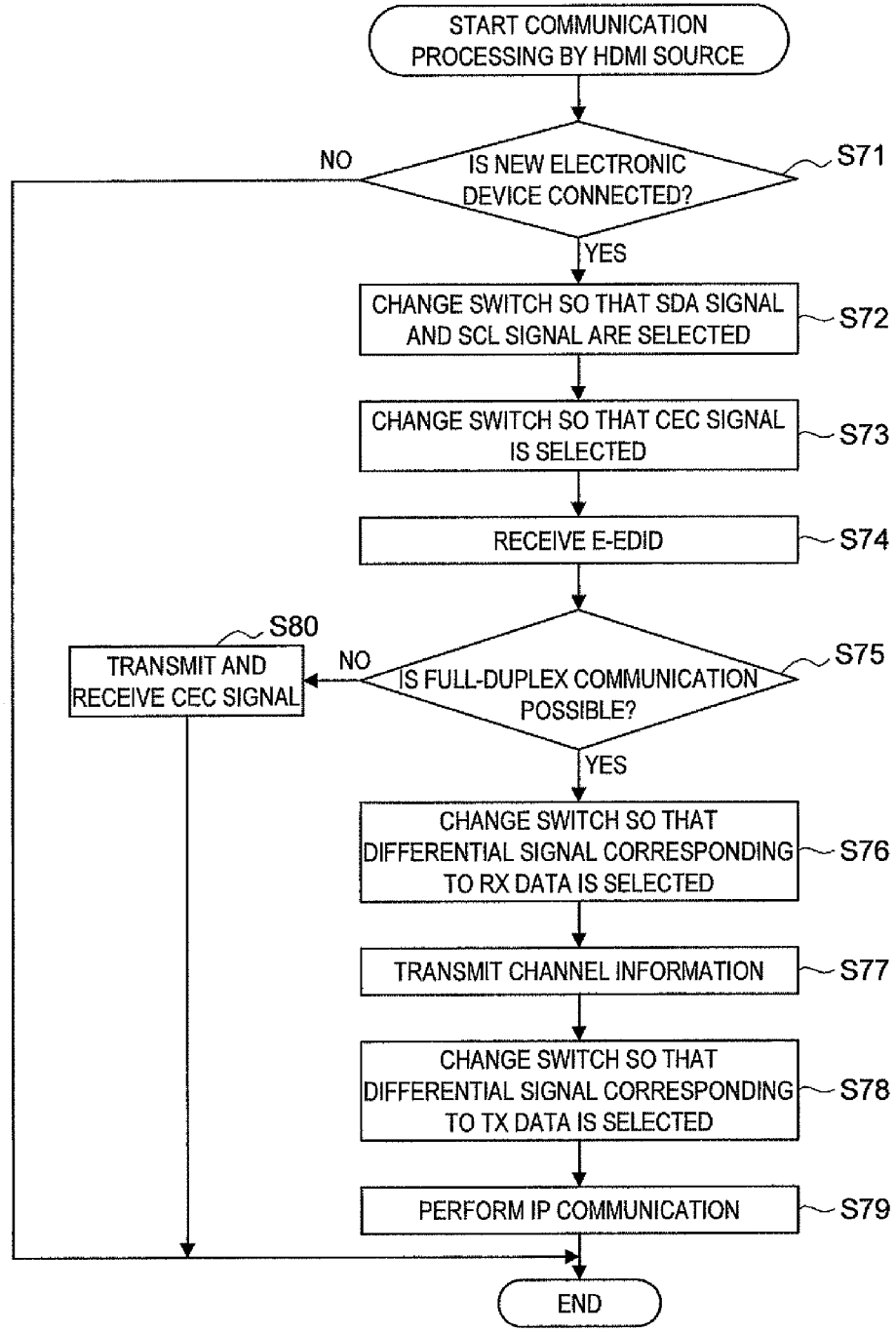
FIG. 21 is a flowchart describing communication processing by the source device.

The flow chart in FIG. 21 is referenced below to describe communication processing by the source device shown in FIG. 16.

At step S71, the source device determines whether a new electronic device is connected to the source device. If determined at step S71 that no new electronic device is connected, communication is not performed and thus, communication processing ends.

In contrast, if determined at step S71 that a new electronic device is connected, at step S72, the switching control unit 171 controls the switch 181 and the switch 182 to change the switch 181 and the switch 182 in such a way that an SDA signal from the control unit (CPU) of the source device is selected by the switch 181 and an SCL signal from the control unit (CPU) of the source device is selected by the switch 182 while data is transmitted and further, an SDA signal from the sink device is selected by the switch 181 while data is received.

At step S73, the switching control unit 121 controls the switch 133 to change the switch 133 in such a way that a CEC signal from the control unit (CPU) of the source device is selected while data is transmitted and a CEC signal from the sink device is selected while data is received.

At step S74, the source device receives E-EDID transmitted from the sink device via the SDA line 191 of the DDC 83. That is, when the sink device detects connection of a source device, the sink device reads E-EDID from the EDID ROM 85 and transmits the read E-EDID to the source device via the SDA line 191 of the DDC 83 and therefore, the source device receives E-EDID transmitted from the sink device.

At step S75, the source device determines whether full-duplex communication with the sink device is possible. That is, the source device references E-EDID received from the sink device to determine whether or not the full-duplex flag "Full Duplex" in FIG. 18 is set. If, for example, the full-duplex flag is set, the source device determines that IP communication in both directions by the full-duplex communication method, that is, full-duplex communication is possible.

If determined at step S75 that full-duplex communication is possible, at step S76, the switching control unit 171 controls the switch 181 and the switch 182 to change the switch 181 and the switch 182 in such a way that a differential signal corresponding to Rx data from the sink device is selected while data is received.

That is, the switching control unit 171 changes the switch 181 and the switch 182 so that, of partial signals constituting a differential signal corresponding to Rx data transmitted from the sink device, a partial signal transmitted via the SDA line 191 is selected by the switch 181 and that transmitted via the SCL line 192 is selected by the switch 182 while data is received.

The SDA line 191 and the SCL line 192 constituting the DDC 83 are not used after E-EDID is transmitted from the sink device to the source device, that is, neither SDA signal nor SCL signal is transmitted via the SDA line 191 and the SCL line 192 and therefore, the SDA line 191 and the SCL line 192 can be used as transmission paths of Rx data in full-duplex communication by changing the switch 181 and the switch 182.

At step S77, the source device transmits, as channel information showing channels of communication in both directions, channel information notifying that IP communication by the full-duplex communication method using the CEC line 84 and the reserved line 88, and the SDA line 191 and the SCL line 192 will be performed is transmitted to the sink device via the switch 133 and the CEC line 84.

That is, if the full-duplex flag is set, the source device knows that the sink device has the configuration shown in FIG. 16 and full-duplex communication using the CEC line 84 and the reserved line 88, and the SDA line 191 and the SCL line 192 can be performed and thus, the source device notifies that full-duplex communication will be performed by transmitting channel information to the sink device.

At step S78, the switching control unit 121 controls the switch 133 to change the switch 133 in such a way that a differential signal corresponding to Tx data from the conversion unit 131 is selected while data is transmitted. That is, the switching control unit 121 changes the switch 133 so that a partial signal of the differential signal corresponding to Tx data supplied from the conversion unit 131 to the switch is selected.

At step S79, the source device performs IP communication in both directions with the sink device by the full-duplex communication method, thereby ending communication processing. That is, while data is transmitted, the conversion unit 131 converts Tx data supplied from the control unit (CPU) of the source device into a differential signal and supplies one partial signal constituting the differential signal obtained by conversion to the switch 133 and transmits the other partial signal to the sink device via the reserved line 88. The switch 133 transmits the partial signal supplied from the conversion unit 131 to the sink device via the CEC line 84. Accordingly, the differential signal corresponding to Tx data is transmitted from the source device to the sink device.

Also while data is received, the decoding unit 183 receives a differential signal corresponding to Rx data transmitted from the sink device. That is, the switch 181 receives a partial signal of the differential signal corresponding to Rx data transmitted from the sink device via the SDA line 191 and supplies the received partial signal to the decoding unit 183. The switch 182 receives the other partial signal of the differential signal corresponding to Rx data transmitted from the sink device via the SCL line 192 and supplies the received partial signal to the decoding unit 183. The decoding unit 183 decodes a differential signal having the partial signal supplied from the switch 181 and the partial signal supplied from the switch 182 into Rx data, which is original data, before outputting the Rx data to the control unit (CPU).

Accordingly, the source device exchanges various kinds of data such as control data, pixel data, and sound data with the sink device.

If determined at step S75 that full-duplex communication is hard to perform, at step S80, the source device performs communication in both directions with the sink device by transmitting and receiving CEC signals before ending communication processing.

That is, the source device exchanges control data with the sink device by transmitting a CEC signal to the sink device via the switch 133 and the CEC line 84 while data is transmitted and receiving a CEC signal transmitted from the sink device via the switch 133 and the CEC line 84 while data is received.

Thus, the source device references the full-duplex flag and performs full-duplex communication with a sink device with which full-duplex communication can be performed using the CEC line 84 and the reserved line 88, and the SDA line 191 and the SCL line 192.

Thus, high-speed bidirectional communication can be performed while maintaining compatibility with HDMI in related art by selecting data to be transmitted and that to be received by changing the switch 133, the switch 181, and the switch 182 and performing full-duplex communication using the CEC line 84 and the reserved line 88, and the SDA line 191 and the SCL line 192 with the sink device.

If the sink device has the configuration shown in FIG. 16, like the sink device shown in FIG. 15, the sink device performs communication processing to perform communication in both directions with the source device.

Figure 22:
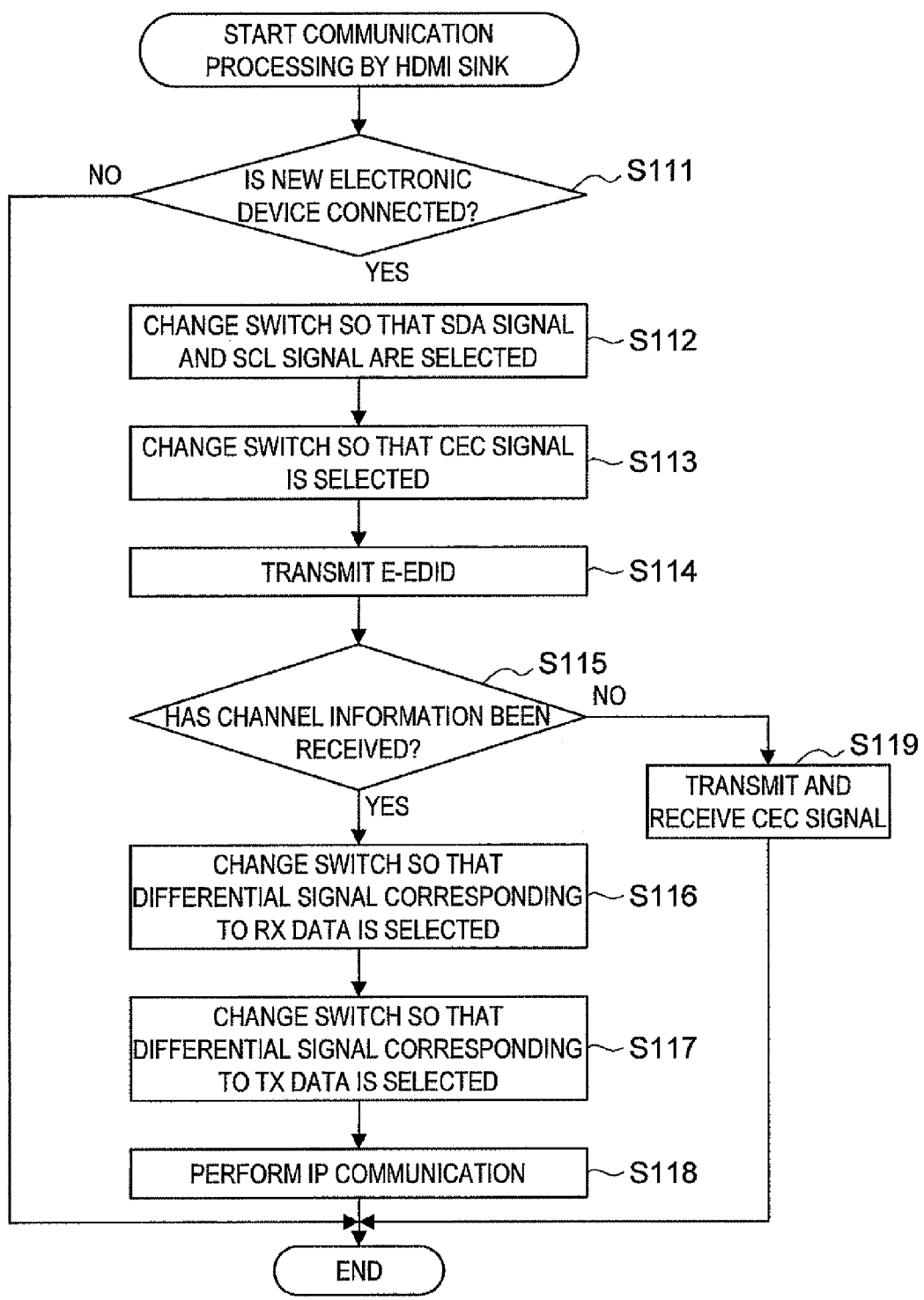
FIG. 22 is a flowchart describing communication processing by the sink device.

The flow chart in FIG. 22 is referenced below to describe communication processing by the sink device shown in FIG. 16.

At step S111, the sink device determines whether a new electronic device (source device) is connected to the sink device. If determined at step S111 that no new electronic device is connected, communication is not performed and thus, communication processing ends.

In contrast, if determined at step S111 that a new electronic device is connected, at step S112, the switching control unit 172 controls the switch 185 and the switch 186 to change the switch 185 and the switch 186 in such a way that an SDA signal from the control unit (CPU) of the sink device is selected by the switch 185 and an SCL signal from the source device is selected by the switch 186 while data is received.

At step S113, the switching control unit 124 controls the switch 135 to change the switch 135 in such a way that a CEC signal from the control unit (CPU) of the sink device is selected while data is transmitted and a CEC signal from the source device is selected while data is received.

At step S114, the sink device reads E-EDID from the EDID ROM 85 and transmits the read E-EDID to the source device via the switch 185 and the SDA line 191 of the DDC 83.

At step S115, the sink device determines whether channel information transmitted from the source device has been received.

That is, channel information indicating channels of communication in both directions in accordance with functions of the source device and sink device is transmitted from the source device. If, for example, the source device is configured as shown in FIG. 16, the source device and sink device can perform full-duplex communication. Thus, channel information notifying that IP communication by the full-duplex communication method using the CEC line 84 and the reserved line 88, and the SDA line 191 and the SCL line 192 will be performed is transmitted from the source device to the sink device. The sink device receives the channel information transmitted from the source device via the switch 135 and the CEC line 84 and determines that channel information has been received.

If, on the other hand, the source device does not have a function to perform full-duplex communication, channel information is not transmitted from the source device to the sink device and thus, the sink device determines that channel information has not been received.

If determined at step S115 that channel information has been received, processing proceeds to step S116 and the switching control unit 172 controls the switch 185 and the switch 186 to change the switch 135 and the switch 186 in such a way that a differential signal corresponding to Rx data from the conversion unit 184 is selected while data is transmitted.

At step S117, the switching control unit 124 controls the switch 135 to change the switch 135 in such a way that a differential signal corresponding to Tx data from the source device is selected while data is received.

At step S118, the sink device performs IP communication in both directions with the source device by the full-duplex communication method, thereby ending communication processing. That is, while data is transmitted, the conversion unit 184 converts Rx data supplied from the control unit (CPU) of the sink device into a differential signal and supplies one partial signal constituting the differential signal obtained by conversion to the switch 185 and supplies the other partial signal to the switch 186. The switch 185 and the switch 186 transmit the partial signals supplied from the conversion unit 184 to the source device via the SDA line 191 and the SCL line 192. Accordingly, the differential signal corresponding to Rx data is transmitted from the sink device to the source device.

Also while data is received, the decoding unit 136 receives a differential signal corresponding to Tx data transmitted from the source device. That is, the switch 135 receives a partial signal of the differential signal corresponding to Tx data transmitted from the source device via the CEC line 84 and supplies the received partial signal to the decoding unit 136. The decoding unit 136 decodes a differential signal having the partial signal supplied from the switch 135 and the partial signal supplied from the source device via the reserved line 88 into Tx data, which is original data, before outputting the Tx data to the control unit (CPU).

Accordingly, the sink device exchanges various kinds of data such as control data, pixel data, and sound data with the source device.

If determined at step S115 that channel information has not been received, at step S119, the sink device performs communication in both directions with the source device by transmitting and receiving CEC signals before ending communication processing.

In this manner, after receiving channel information, the sink device performs full-duplex communication with the source device by using the CEC line 84 and the reserved line 88, and the SDA line 191 and the SCL line 192.

Thus, the sink device can perform high-speed bidirectional communication while maintaining compatibility with HDMI in related art by selecting data to be transmitted and that to be received by changing the switch 135, the switch 185, and the switch 186 and performing full-duplex communication with the source device using the CEC line 84 and the reserved line 88, and the SDA line 191 and the SCL line 192.

In the example in FIG. 16, the source device has the configuration in which the conversion unit 131 is connected to the CEC line 84 and the reserved line 88 and the decoding unit 183 is connected to the SDA line 191 and the SCL line 192. However, the source device may have a configuration in which the decoding unit 183 is connected to the CEC line 84 and the reserved line 88 and the conversion unit 131 is connected to the SDA line 191 and the SCL line 192.

In such a case, the switch 181 and the switch 182 are connected to the CEC line 84 and the reserved line 88 and also to the decoding unit 183 and the switch 133 is connected to the SDA line 191 and also to the conversion unit 131.

Similarly for the sink device in FIG. 16, the sink device may have a configuration in which the conversion unit 184 is connected to the CEC line 84 and the reserved line 88 and the decoding unit 136 is connected to the SDA line 191 and the SCL line 192. In such a case, the switch 185 and the switch 186 are connected to the CEC line 84 and the reserved line 88 and also to the conversion unit 184 and the switch 135 is connected to the SDA line 191 and also to the decoding unit 136.

Further, in FIG. 15, the CEC line 84 and the reserved line 88 may be the SDA line 191 and the SCL line 192. That is, the conversion unit 131 and the decoding unit 132 of the source device and the conversion unit 134 and the decoding unit 136 of the sink device may be connected to the SDA line 191 and the SCL line 192 to perform IP communication by the half-duplex communication method between the source device and sink device. Further, in this case, connection of an electronic device may be detected by using the reserved line 88.

Further, each of the source device and sink device may have both functions of performing half-duplex communication and full-duplex communication. In such a case, the source device and sink device can perform IP communication by the half-duplex communication method or full-duplex communication method depending on the function of a connected electronic device.

Figure 23:
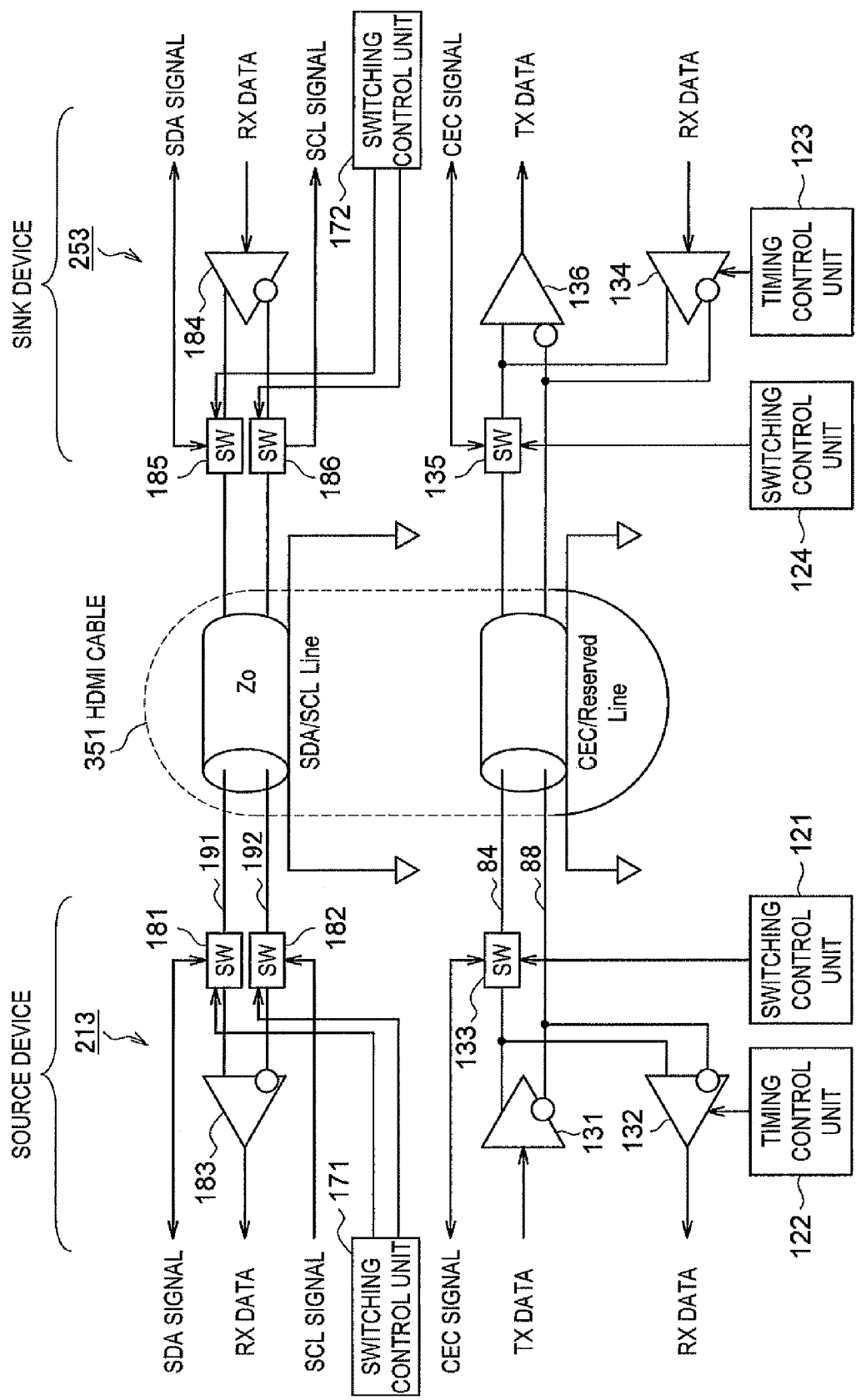
FIG. 23 is a connection diagram showing another configuration example of the high-speed data line interface between the set top box and the TV set.

If each of the source device and sink device has both functions of performing half-duplex communication and full-duplex communication, the source device and sink device are configured as shown, for example, in FIG. 23. In FIG. 23, the same reference numerals are attached to corresponding units in FIG. 15 or FIG. 16 and a description thereof is omitted when deemed appropriate.

The high-speed data line interface 213 of the source device shown in FIG. 23 has the conversion unit 131, the decoding unit 132, the switch 133, the switch 181, the switch 182, the decoding unit 183, the switching control unit 121, the timing control unit 122, and the switching control unit 171. That is, the high-speed data line interface 213 of the source device in FIG. 23 has a configuration in which the high-speed data line interface 13 in the source device shown in FIG. 16 is further provided with the timing control unit 122 and the decoding unit 132 in FIG. 15.

The high-speed data line interface 253 of the sink device shown in FIG. 23 has the conversion unit 134, the switch 135, the decoding unit 136, the conversion unit 184, the switch 185, the switch 186, the timing control unit 123, the switching control unit 124, and the switching control unit 172. That is, the sink device in FIG. 23 has a configuration in which the sink device shown in FIG. 16 is further provided with the timing control unit 123 and the conversion unit 134 in FIG. 15.

Next, communication processing by the source device and sink device shown in FIG. 23 will be described.

Figure 24:
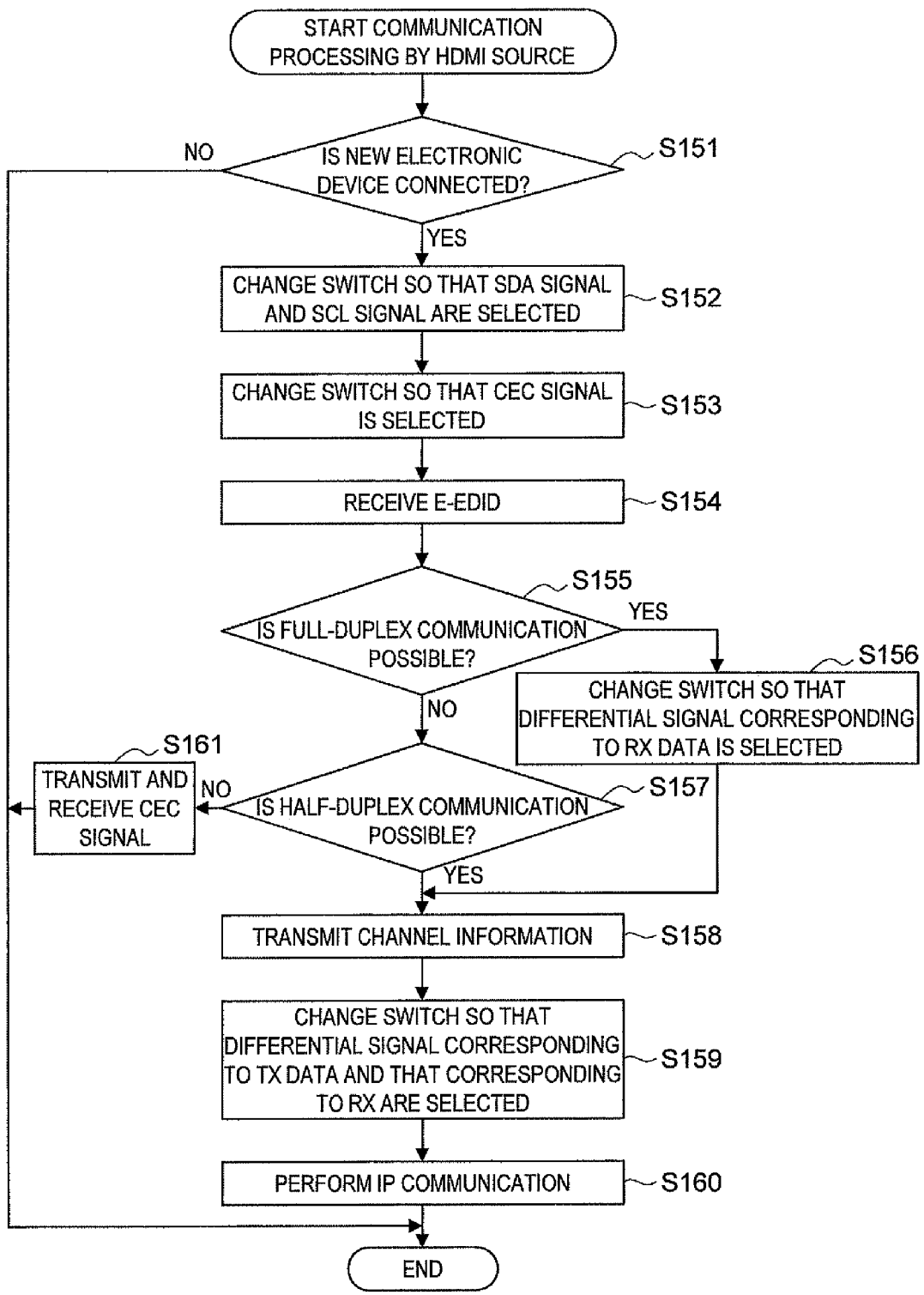
FIG. 24 is a flowchart describing communication processing by the source device.

First, the flow chart in FIG. 24 is referenced to describe communication processing by the source device in FIG. 23. Respective processing of step S151 to step S154 is the same as that of step S71 to S74 in FIG. 21 and thus, a description thereof is omitted.

At step S155, the source device determines whether full-duplex communication with the sink device is possible. That is, the source device references E-EDID received from the sink device to determine whether the full-duplex flag "Full Duplex" in FIG. 18 is set.

If determined at step S155 that full-duplex communication is possible, that is, the sink device shown in FIG. 23 or FIG. 16 is connected to the source device, at step S156, the switching control unit 171 controls the switch 181 and the switch 182 to change the switch 181 and the switch 182 in such a way that a differential signal corresponding to Rx data from the sink device is selected while data is received.

On the other hand, if determined at step S155 that full-duplex communication is hard to perform, at step S157, the source device determines whether half-duplex communication is possible. That is, the source device references the received E-EDID to determine whether the half-duplex flag "Half Duplex" in FIG. 18 is set. In other words, the source device determines whether the sink device shown in FIG. 15 is connected to the source device.

If determined at step S157 that half-duplex communication is possible, or at step S156, the switch 181 and the switch 182 are changed, at step S158, the source device transmits channel information to the sink device via the switch 133 and the CEC line 84.

Here, when determined at step S155 that full-duplex communication is possible, the sink device has a function to perform full-duplex communication and thus, the source device transmits a signal indicating that IP communication using the CEC line 84 and the reserved line 88, and the SDA line 191 and the SCL line 192 will be performed to the sink device via the switch 133 and the CEC line 84 as channel information.

When determined at step S157 that half-duplex communication is possible, the sink device does not has a function to perform full-duplex communication, but has a function to perform half-duplex communication and thus, the source device transmits a signal indicating that IP communication using the CEC line 84 and the reserved line 88 will be performed to the sink device via the switch 133 and the CEC line 84 as channel information.

At step S159, the switching control unit 121 controls the switch 133 to change the switch 133 in such a way that a differential signal corresponding to Tx data from the conversion unit 131 is selected while data is transmitted and a differential signal corresponding to Rx data transmitted from the sink device is selected while data is received. When the source device and sink device perform full-duplex communication, a differential signal corresponding to Rx data is not transmitted from the sink device via the CEC line 84 and the reserved line 88 while data is received by the source device and thus, no differential signal corresponding to Rx data is supplied to the decoding unit 132.

At step S160, the source device performs IP communication with the sink device in both directions, thereby ending communication processing. That is, when the source device performs full-duplex communication or half-duplex communication with the sink device, the conversion unit 131 converts Tx data supplied from the control unit (CPU) of the source device into a differential signal and transmits one partial signal constituting the differential signal obtained by conversion to the sink device via the switch 133 and the CEC line 84 and the other partial signal to the sink device via the reserved line 88.

When the source device performs full-duplex communication with the sink device, the decoding unit 183 receives a differential signal corresponding to Rx data transmitted from the sink device while data is received and decodes the received differential signal into Rx data, which is original data, before outputting the Rx data to the control unit (CPU).

In contrast, when the source device performs half-duplex communication with the sink device, the decoding unit 132 receives a differential signal corresponding to Rx data transmitted from the sink device based on control of the timing control unit 122 while data is received and decodes the received differential signal into Rx data, which is original data, before outputting the Rx data to the control unit (CPU).

Accordingly, the source device exchanges various kinds of data such as control data, pixel data, and sound data with the sink device.

If determined at step S157 that half-duplex communication is hard to perform, at step S161, the source device performs communication in both directions with the sink device by transmitting and receiving CEC signals via the CEC line 84 before ending communication processing.

In this manner, the source device references the full-duplex flag and half-duplex flag to perform full-duplex communication or half-duplex communication depending on the function of the sink device, which is a communication partner.

Thus, the optimal communication method can be selected to perform high-speed bidirectional communication while maintaining compatibility with HDMI in related art by selecting data to be transmitted and that to be received by changing the switch 133, the switch 181, and the switch 182 and performing full-duplex communication or half-duplex communication in accordance with the function held by the sink device, which is a communication partner.

Figure 25:
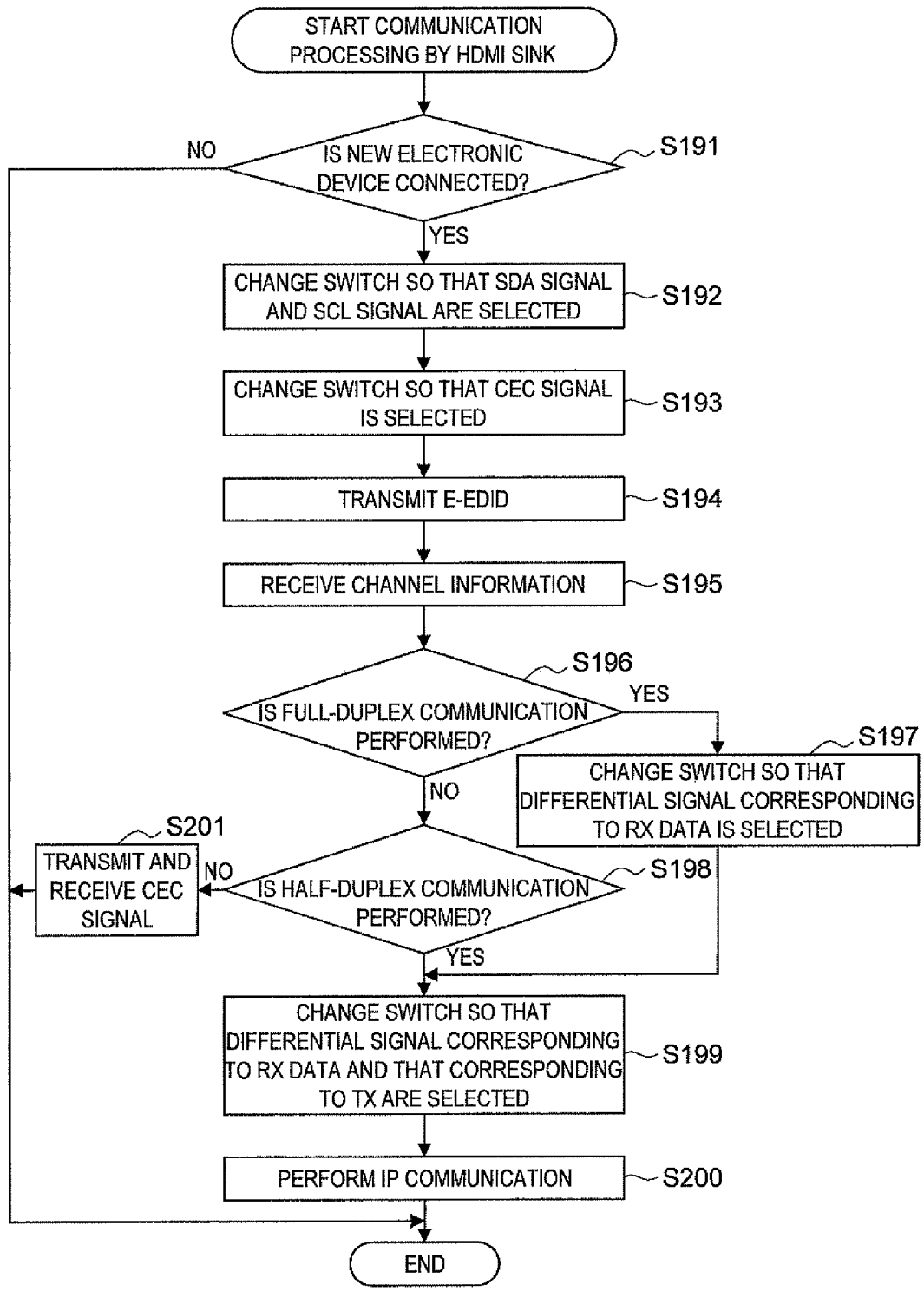
FIG. 25 is a flowchart describing communication processing by the sink device.

Next, the flow chart in FIG. 25 is referenced to describe communication processing by the sink device in FIG. 23. Respective processing of step S191 to step S194 is the same as that of step S111 to S114 in FIG. 22 and thus, a description thereof is omitted.

At step S195, the sink device receives channel information transmitted from the source device via the switch 135 and the CEC line 84. If the source device connected to the sink device has neither a function to perform full-duplex communication nor that to perform half-duplex communication, channel information is not transmitted from the source device to the sink device and thus, the sink device does not receive channel information.

At step S196, the sink device determines whether to perform full-duplex communication based on the received channel information. If, for example, the sink device receives channel information notifying that IP communication using the CEC line 84 and the reserved line 88, and the SDA line 191 and the SCL line 192 will be performed, the sink device determines to perform full-duplex communication.

If determined at step S196 to perform full-duplex communication, at step S197, the switching control unit 172 controls the switch 185 and the switch 186 to change the switch 185 and the switch 186 in such a way that a differential signal corresponding to Rx data from the conversion unit 184 is selected while data is transmitted.

If determined at step S196 not to perform full-duplex communication, at step S198, the sink device determines whether to perform half-duplex communication based on the received channel information. If, for example, the sink device receives channel information notifying that IP communication using the CEC line 84 and the reserved line 88 will be performed, the sink device determines to perform half-duplex communication.

If determined at step S198 to perform half-duplex communication, or at step S197, the switch 185 and the switch 186 are changed, at step S199, the switching control unit 124 controls the switch 135 to change the switch 135 in such a way that a differential signal corresponding to Rx data from the conversion unit 134 is selected while data is transmitted and a differential signal corresponding to Tx data from the source device is selected while data is received.

When the source device and sink device perform full-duplex communication, a differential signal corresponding to Rx data is not transmitted from the conversion unit 134 to the transmitter 81 while data is transmitted by the sink device and thus, no differential signal corresponding to Rx data is supplied to the switch 135. At step S200, the sink device performs IP communication with the source device in both directions, thereby ending communication processing.

That is, when the sink device performs full-duplex communication with the source device, the conversion unit 184 converts Rx data supplied from the control unit (CPU) of the sink device into a differential signal while data is transmitted and transmits one partial signal constituting the differential signal obtained by conversion to the source device via the switch 185 and the SDA line 191 and the other partial signal to the source device via the switch 186 and the SCL line 192.

When the sink device performs half-duplex communication with the source device, the conversion unit 134 converts Rx data supplied from the control unit (CPU) of the sink device into a differential signal while data is transmitted and transmits one partial signal constituting the differential signal obtained by conversion to the transmitter via the switch 185 and the CEC line 84 and the other partial signal to the source device via the reserved line 88.

Further, when the sink device performs full-duplex communication or half-duplex communication with the source device, the decoding unit 136 receives a differential signal corresponding to Tx data transmitted from the source device while data is received and decodes the received differential signal into Tx data, which is original data, before outputting the Tx data to the control unit (CPU).

If determined at step S198 not to perform half-duplex communication, that is, if, for example, no channel information is received, at step S201, the sink device performs communication in both directions with the source device by transmitting and receiving CEC signals before ending communication processing.

In this manner, the sink device performs full-duplex communication or half-duplex communication in accordance with received channel information, that is, a function of the source device, which is a communication partner.

Thus, the optimal communication method can be selected to perform high-speed bidirectional communication while maintaining compatibility with HDMI (R) in related art by selecting data to be transmitted and data to be received by changing the switch 135, the switch 185, and the switch 186 and performing full-duplex communication or half-duplex communication in accordance with the function held by the source device, which is a communication partner.

By connecting the source device and sink device by the HDMI cable 351 containing the CEC line 84 and the reserved line 88 that are mutually differential twisted pair connected and shielded and are grounded to a ground line and the SDA line 191 and the SCL line 192 that are grounded to a ground line, high-speed IP communication in both directions by the half-duplex communication method or full-duplex communication method can be performed while maintaining compatibility with HDMI cable in related art.

Next, the above sequence of processing can be performed by dedicated hardware or software. If the sequence of processing should be performed by software, a program constituting the software is installed, for example, in a microcomputer controlling the source device and sink device.

Figure 26:
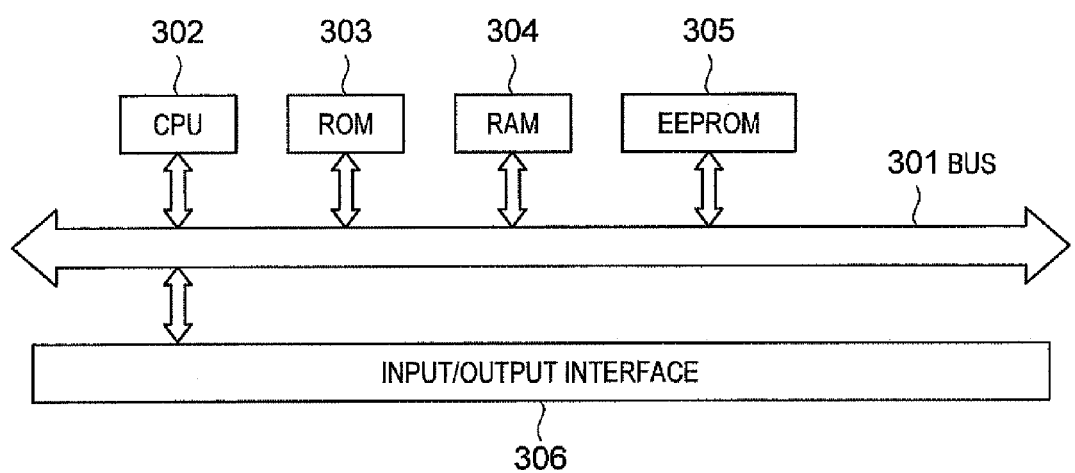
FIG. 26 is a block diagram showing a configuration example of a computer to which the present invention is applied.

Thus, FIG. 26 shows a configuration example of the computer in which the program for performing the above sequence of processing is installed.

The program can be recorded in advance in an EEPROM (electrically erasable programmable read-only memory) 305 or a ROM 303 as a recording medium contained in the computer.

Alternatively, the program can be stored (recorded) temporarily or permanently in a removable recording medium such as a flexible disc, CD-ROM (compact disc read only memory), MO (magneto optical) disc, DVD (digital versatile disc), magnetic disc, and semiconductor memory. Such a removable recording medium can be provided as so-called package software.

In addition to installing the program in the computer from a removable recording medium as described above, the program can be installed in the contained EEPROM 305 by transferring the program from a download site to the computer by radio via an artificial satellite for digital satellite broadcasting or through wire via a network such as LAN and the Internet and receiving the program transferred as described above by an input/output interface 306 in the computer.

The computer contains a CPU (central processing unit) 302. The input/output interface 306 is connected to the CPU 302 via a bus 301 and the CPU 302 executes programs stored in the ROM (read only memory) 303 or the EEPROM 305 by loading such programs into a RAM (random access memory) 304. The CPU 302 performs thereby processing according to the above flow chart or processing performed by the configuration of the above block diagram.

Here, processing steps herein describing a program for causing the computer to perform various kinds of processing do not have to be performed chronologically according to a sequence described in a flow chart and includes processing performs in parallel or individually (for example, parallel processing and processing by an object). The program may be executed by a single computer or a plurality of computers in a distributed manner.

Figure 27:
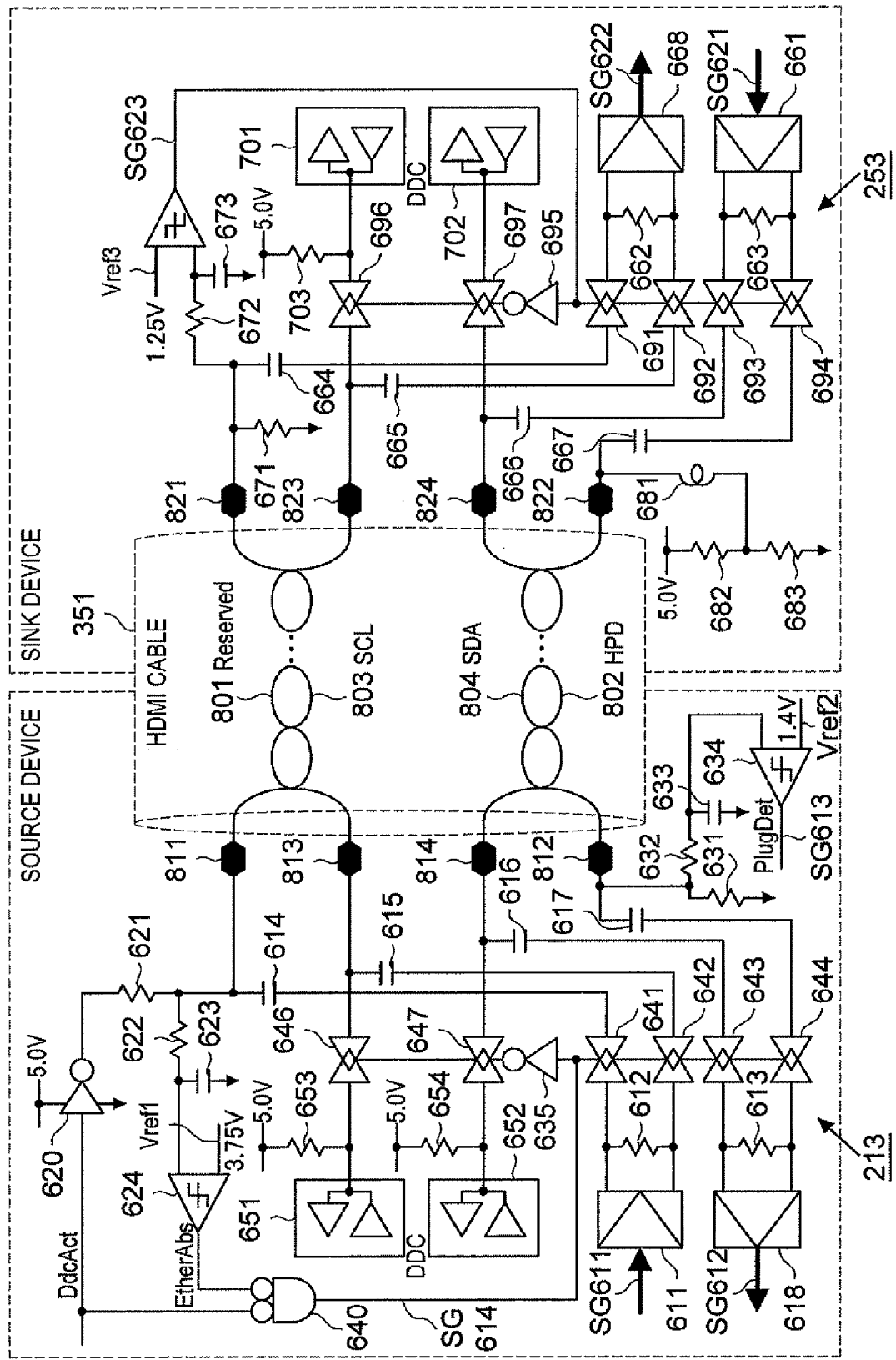
FIG. 27 is a connection diagram showing still another configuration example of the high-speed data line interface between the set top box and the TV set.

While the above configuration example shown in FIG. 8 can form a circuit for LAN communication regardless of electrical specifications specified for DDC, FIG. 27 shows another configuration example having a similar effect.

This example is characterized in that in an interface in which transmission of video and sound data, exchange of connected device information, communication of authentication and device control data, and LAN communication are performed by one cable, LAN communication is performed by unidirectional communication via two pairs of differential transmission paths, the connected state of the interface is notified by the DC bias potential of at least one of transmission paths, and further at least two transmission paths are used for exchange of connected device information and communication of authentication in time division mode with LAN communication.

The source device has a LAN signal transmitting circuit 611, terminating resistors 612 and 613, AC coupling capacitors 614 to 617, a LAN signal receiving circuit 618, an inverter 620, a resistor 621, a resistor 622 and a capacitor 623 forming a low-pass filter, a comparator 624, a pull-down resistor 631, a resistor 632 and a capacitor 633 forming a low-pass filter, a comparator 634, an NOR gate 640, analog switches 641 to 644, an inverter 645, analog switches 646 and 647, DDC transceivers 651 and 652, and pull-up resistors 653 and 654.

A sink device 602 has a LAN signal transmitting circuit 661, terminating resistors 662 and 663, AC coupling capacitors 664 to 667, a LAN signal receiving circuit 668, a pull-down resistor 671, a resistor 672 and a capacitor 673 forming a low-pass filter, a comparator 674, a choke coil 681, resistors 682 and 683 serially connected to between the power supply potential and reference potential, analog switches 691 to 694, an inverter 695, analog switches 696 and 697, DDC transceivers 701 and 702, and pull-up resistors 703 and 704.

The HDMI cable 351 has differential transmission paths having a reserved line 801 and an SCL line 803 and those having an SDA line 804 and an HPD line 802 therein and also has source-side terminals 811 to 814 and sink-side terminals 821 to 824 thereof formed thereon. The reserved line 801 and the SCL line 803, and the SDA line 804 and the HPD line 802 are each connected as a differential twisted pair.

Inside the source device, the terminals 811 and 813 are connected to the transmitting circuit 611 for transmitting a LAN transmission signal SG611 to the sink device and the terminating resistor 612 via the AC coupling capacitors 614 and 615 and the analog switches 641 and 642. The terminals 814 and 812 are connected to the receiving circuit 618 for receiving a LAN transmission signal from a sink device and the terminating resistor 613 via the AC coupling capacitors 616 and 617 and the analog switches 643 and 644.

Inside the sink device, the terminals 821 to 824 are connected to the transmitting circuit 661 and the receiving circuit 668 and the terminating resistors 662 and 663 via the AC coupling capacitors 664, 665, 666, 667 and the analog switches 691 to 694. The analog switches 641 to 644 and 691 to 694 are on when LAN communication is performed and off when DDC communication is performed.

The source device connects the terminals 813 and 814 to the DDC transceivers 651 and 652 and the pull-up resistors 653 and 654 via the other analog switches 646 and 647.

The sink device connects the terminals 823 and 824 to the DDC transceivers 701 and 702 and the pull-up resistor 703 via the analog switches 696 and 697. The analog switches 646 and 647 are on when DDC communication is performed and off when LAN communication is performed.

The recognition mechanism of e-HDMI compatible devices by the potential of the reserved line 801 is basically the same as an example shown in FIG. 8 except that a resistor 62 of a source device 601 is driven by the inverter 620.

When input of the inverter 620 is HIGH, the resistor 621 becomes a pull-down resistor, yielding a state of 0 V, which is the same when an e-HDMI incompatible device is connected. As a result, a signal SG623 that shows an e-HDMI compatibility recognition result of the sink device becomes LOW and the analog switches 691 to 694 controlled by the signal SG623 are turned off and the analog switches 696 and 697 that are controlled by a signal obtained by inverting the signal SG623 by the inverter 695 are turned on. As a result, the sink device 602 is in a state in which the SCL line 803 and the SDA line 804 are disconnected from the LAN transmitter receiver and connected to the DDC transmitter receiver.

In the source device, on the other hand, input of the inverter 620 is also input to the NOR gate 640 and an output SG614 thereof becomes LOW. The analog switches 641 to 644 controlled by the signal SG614 of the NOR gate 640 are turned off and the analog switches 646 and 647 that are controlled by a signal obtained by inverting the signal SG614 by the inverter 645 are turned on. As a result, the source device 601 is also in a state in which the SCL line 803 and the SDA line 804 are disconnected from the LAN transmitter receiver and connected to the DDC transmitter receiver.

Conversely, when input of the inverter 620 is LOW, both the source device and sink device are in a state in which the SCL line 803 and the SDA line 804 are disconnected from the DDC transmitter receiver and connected to the LAN transmitter receiver.

The circuits 631 to 634 and 681 to 683 for checking connection by the DC bias potential of the HPD line 802 have a function similar to the example shown in FIG. 8. That is, in addition to LAN communication described above, the HPD line 802 notifies the source device that the cable 351 is connected to a sink device at a DC bias level. The resistors 682 and 683 and the choke coil 681 inside the sink device bias the HPD line 802 to about 4 V via the terminal 822 when the cable 351 is connected to the sink device.

The source device extracts the DC bias of the HPD line 802 by the low-pass filter made up of the resistor 632 and the capacitor 633 and compares the DC bias with the reference potential Vref2 (for example, 1.4 V) using the comparator 634. If the cable 351 is not connected to the sink device, the potential of the terminal 812 is lower than the reference potential Vref2 due to the pull-down resistor 631 and if the cable 351 is connected, the potential of the terminal 812 is higher. Therefore, HIGH of an output signal SG613 of the comparator 634 indicates that the cable 351 and the sink device are connected. On the other hand, LOW of the output signal SG613 of the comparator 634 indicates that the cable 351 and the sink device are not connected.

According to the configuration example in FIG. 27, as described above, in an interface in which transmission of video and sound data, exchange of connected device information, communication of authentication and device control data, and LAN communication are performed by one cable, LAN communication is performed by unidirectional communication via two pairs of differential transmission paths, the connected state of the interface is notified by the DC bias potential of at least one of transmission paths, and further at least two transmission paths are used for exchange of connected device information and communication of authentication in time division mode with LAN communication and therefore, time division can be realized by which a time is divided into a time zone in which the SCL and SDA lines are connected to the LAN communication circuit by a switch and that in which the SCL and SDA lines are connected to the DDC circuit, and a circuit for LAN communication can be formed regardless of electrical specifications specified for DDC by the division so that stable and reliable LAN communication can be realized at low costs.

Incidentally, the resistor 621 shown in FIG. 27 may be provided inside the HDMI cable 351, instead of inside the source device. In such a case, each of terminals of the resistor 621 is connected, among lines provided inside the HDMI cable 351, to the reserved line 801 and a line (signal line) connected to the power supply (power supply potential).

Further, the pull-down resistor 671 and the resistor 683 shown in FIG. 27 may be provided inside the HDMI cable 351, instead of inside the sink device. In such a case, each of terminals of the pull-down resistor 671 is connected, among lines provided inside the HDMI cable 351, to the reserved line 801 and a line (ground line) connected to the ground (reference potential). Also, each of terminals of the resistor 683 is connected, among lines provided inside the HDMI cable 351, to the HPD line 802 and the line (ground line) connected to the ground (reference potential).

SDA and SCL are used to perform communication in which H realizes 1.5 kΩ pull-up and L realizes low impedance pull-down. Also, CEC is used to perform communication in which H realizes 27 kΩ pull-up and L realizes low impedance pull-down. Holding these functions to maintain compatibility with existing HDMI could make difficult sharing the LAN function that performs high-speed data communication in which matching termination of termination of a transmission line is needed.

The configuration examples in FIG. 8 and FIG. 27 can avoid such an issue. That is, in the configuration example in FIG. 8, full-duplex communication based on one-pair bidirectional communication is performed by forming a differential pair from a reserved line and an HPD line while avoiding the use of the SDA, SCL, and CEC lines. In the configuration example in FIG. 27, two-pair bidirectional communication in which unidirectional communication is performed by each of two differential pairs formed from HPD and SDA lines and SCL and reserved lines is performed.

FIG. 28A to FIG. 28E show bidirectional communication waveforms in the configuration example in FIG. 8 or FIG. 27.

FIG. 28A shows a signal waveform transmitted from the sink device, FIG. 28B shows a signal waveform received by the sink device, FIG. 28C shows a signal waveform passing through a cable, FIG. 28D shows a signal waveform received by the source device, and FIG. 28E shows a signal waveform transmitted from the source device. As is evident from FIG. 28A to FIG. 28E, according to the configuration example in FIG. 8 or FIG. 27, satisfactory bidirectional communication can be realized.

It should be understood by those skilled in the art that various modifications, combinations, sub-combinations and alterations may occur depending on design requirements and other factors insofar as they are within the scope of the appended claims or the equivalents thereof.

In the above embodiment, an example in which the electronic program information EPGb of the set top box 210 is transmitted to the TV set 250 using a high-speed data line to make the most of the electronic program information EPGb is described. Though details are omitted, the electronic program information EPGa of the TV set 250 can similarly be transmitted to the set top box 210 to make the most of the electronic program information EPGa. In this case, it becomes possible to control program selection or setting for program recording of the TV set 250 from the set top box 210.

Also, the above embodiment has been described by assuming that the set top box 210 receives satellite digital broadcasting, but the set top box 210 may also receive other broadcasting such as cable TV and IP broadcasting or a plurality of types of broadcasting.

Also, the above embodiment assumed an interface of the HDMI standard for transmission paths connecting each device, but the present invention is applicable to other similar transmission standards. Moreover, an example in which a set top box is used the source device and a TV set as the sink device is shown, but the present invention can be applied to other electronic devices having similar functions.

Also, electronic devices are connected by an HDMI cable in the above embodiment, but the present invention can similarly be applied to electronic devices that are connected by radio.

The present invention enables recording of video signals corresponding to display images without causing prices of transmission devices and display devices of video signals to rise and is applicable, for example, to an AV system in which a set top box is connected to a TV set via an HDMI cable.

The invention claimed is:

1. A signal transmitting method of a receiving device having a broadcast receiving unit for obtaining a video signal of a predetermined program and electronic program guide information by receiving a broadcasting signal, comprising the steps of:
   transmitting the video signal obtained by the broadcast receiving unit to an external device via a transmission path through a plurality of channels using a differential signal; and
   transmitting the electronic program guide information obtained by the broadcast receiving unit to the external device via differential transmission lines formed from a pair of lines consisting of a first signal line and a second signal line which are different from the plurality of channels; and
   receiving information about a connected state of an interface by a DC bias potential of a Hot Plug Detect (HPD) line of the transmission path, in which the transmission path is in a High Definition Multimedia Interface (HDMI) cable.

* * * * *